US009942236B2

(12) United States Patent
Takayasu

(10) Patent No.: US 9,942,236 B2
(45) Date of Patent: Apr. 10, 2018

(54) INFORMATION PROCESSING APPARATUS, ACCESS CONTROL METHOD, AND COMMUNICATION SYSTEM

(71) Applicant: Osamu Takayasu, Kanagawa (JP)

(72) Inventor: Osamu Takayasu, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 160 days.

(21) Appl. No.: 14/838,569

(22) Filed: Aug. 28, 2015

(65) Prior Publication Data

US 2016/0072822 A1    Mar. 10, 2016

(30) Foreign Application Priority Data

Sep. 5, 2014   (JP) .................................. 2014-180948

(51) Int. Cl.
*H04L 29/06* (2006.01)
*H04L 12/18* (2006.01)

(52) U.S. Cl.
CPC ........ *H04L 63/102* (2013.01); *H04L 12/1822* (2013.01); *H04L 63/0807* (2013.01); *H04L 63/0815* (2013.01)

(58) Field of Classification Search
None
See application file for complete search history.

(56) References Cited

U.S. PATENT DOCUMENTS

| 8,769,001 | B2  | 7/2014 | Ohwada |            |
|-----------|-----|--------|--------|------------|
| 2013/0007846 | A1* | 1/2013 | Murakami | ............ H04W 12/08 726/4 |
| 2013/0150000 | A1* | 6/2013 | Wong | .................... H04W 12/06 455/411 |

(Continued)

FOREIGN PATENT DOCUMENTS

| EP | 1 895 440 A1 | 3/2008 |
| EP | 2 772 847 A2 | 9/2014 |

(Continued)

OTHER PUBLICATIONS

Extended European Search Report dated Jan. 22, 2016 in Patent Application No. 15183310.0.

(Continued)

*Primary Examiner* — Christopher Revak
(74) *Attorney, Agent, or Firm* — Oblon, McClelland, Maier & Neustadt, L.L.P.

(57) ABSTRACT

An information processing apparatus includes one or more processors, the processor including a reception unit configured to receive an access request transmitted from a terminal and addressed to a resource accessing of which is managed; an authority judgment unit configured to determine whether the access request has authority to access the resource based on an access token included in the access request and used to access the resource; and an access processing unit configured to permit the accessing of the resource when the authority judgment unit determines that the access request has the authority to access the resource, wherein the authority judgment unit determines whether the access request has the authority to access the resource based on a source apparatus having issued the access token and being included in the access token.

14 Claims, 20 Drawing Sheets

(56) References Cited

U.S. PATENT DOCUMENTS

| | | | |
|---|---|---|---|
| 2013/0252583 A1* | 9/2013 | Brown | H04W 12/06 455/411 |
| 2014/0007213 A1* | 1/2014 | Sanin | G06F 21/33 726/9 |
| 2014/0075513 A1* | 3/2014 | Trammel | H04L 9/3213 726/4 |
| 2015/0365419 A1* | 12/2015 | Lau | H04L 63/104 726/4 |

FOREIGN PATENT DOCUMENTS

| | | |
|---|---|---|
| JP | 2005-301424 | 10/2005 |
| JP | 2011-205612 | 10/2011 |

OTHER PUBLICATIONS

N. Sakimura, et al., "Structured Access Token for Sharing Authorization Grant between a Resource Server and an Authorization Server draft-sakimura-oidc-structured-token-01" Internet Draft, Internet Engineering Task Force (IETF), XP015092187, Feb. 2013, 12 Pages.

Jan De Clercq, "Single Sign-On Architectures" XP055241837, 2002, pp. 40-58.

Vibro, "Principles of Token Validation" Cloud Identity, XP055241833, http://www.cloudidentity.com/blog/2014/03/03principles-of-token-validation/ Retrieved on Jan. 15, 2016, 5 Pages.

D. Hardt, "The OAuth 2.0 Authorization Framework" Internet Engineering Task Force (IETF), RFC 6749, XP055218558, Oct. 2012, 76 Pages.

* cited by examiner

FIG.6

DESTINATION LIST 11-4

1100-1
1100-3c
1100-3b
1100-3
1100-3d
1100-2
1100-3a

| | AB TERMINAL TOKYO OFFICE JAPAN | BA TERMINAL OSAKA OFFICE JAPAN | CA TERMINAL NEW YORK OFFICE USA | DA TERMINAL WASHINGTON D.C. OFFICE USA |
|---|---|---|---|---|
| | AC TERMINAL TOKYO OFFICE JAPAN | BB TERMINAL OSAKA OFFICE JAPAN | CB TERMINAL NEW YORK OFFICE USA | DB TERMINAL WASHINGTON D.C. OFFICE USA |
| | AD TERMINAL TOKYO OFFICE JAPAN | BC TERMINAL OSAKA OFFICE JAPAN | CC TERMINAL NEW YORK OFFICE USA | DC TERMINAL WASHINGTON D.C. OFFICE USA |
| | AE TERMINAL TOKYO OFFICE JAPAN | BD TERMINAL TOKYO OFFICE JAPAN | CD TERMINAL NEW YORK OFFICE USA | DD TERMINAL WASHINGTON D.C. OFFICE USA |
| | AF TERMINAL TOKYO OFFICE JAPAN | BE TERMINAL TOKYO OFFICE JAPAN | CE TERMINAL NEW YORK OFFICE USA | DE TERMINAL WASHINGTON D.C. OFFICE USA |
| | AG TERMINAL TOKYO OFFICE JAPAN | BF TERMINAL TOKYO OFFICE JAPAN | CF TERMINAL NEW YORK OFFICE USA | DF TERMINAL WASHINGTON D.C. OFFICE USA |

FIG.7

| IP ADDRESS OF RELAY DESTINATION TERMINAL | IMAGE QUALITY OF RELAYED VIDEO DATA |
|---|---|
| 1.3.2.4 | HIGH IMAGE QUALITY |
| 1.3.1.3 | LOW IMAGE QUALITY |
| 1.3.2.3 | MEDIUM IMAGE QUALITY |
| ... | ... |

FIG.9

| RELAY DEVICE ID | OPERATING STATE | RECEPTION DATE/TIME | IP ADDRESS OF RELAY DEVICE | MAXIMUM DATA TRANSMISSION SPEED (Mbps) |
|---|---|---|---|---|
| 111a | ONLINE | 2009.11.10.13:00 | 1.2.1.2 | 100 |
| 111b | ONLINE | 2009.11.10.13:10 | 1.2.2.2 | 1000 |
| 111c | OFFLINE | 2009.11.10.13:20 | 1.3.1.2 | 100 |
| 111d | ONLINE | 2009.11.10.13:30 | 1.3.2.2 | 10 |

FIG.10

| TERMINAL ID | DESTINATION NAME | OPERATING STATE | COMM. STATE | RECEPTION DATE/TIME | IP ADDRESS OF TERMINAL |
|---|---|---|---|---|---|
| 01aa | AA TERMINAL TOKYO OFFICE JAPAN | ONLINE | NONE | 2009.11.10.13:40 | 1.2.1.3 |
| 01ab | AB TERMINAL TOKYO OFFICE JAPAN | OFFLINE | | 2009.11.09.12:00 | 1.2.1.4 |
| ... | ... | ... | ... | ... | ... |
| 01ba | BA TERMINAL OSAKA OFFICE JAPAN | ONLINE | CALLING | 2009.11.10.13:45 | 1.2.2.3 |
| 01bb | BB TERMINAL OSAKA OFFICE JAPAN | ONLINE | NONE | 2009.11.10.13:50 | 1.2.2.4 |
| ... | ... | ... | ... | ... | ... |
| 01ca | CA TERMINAL NEW YORK OFFICE USA | OFFLINE | | 2009.11.10.12:45 | 1.3.1.3 |
| 01cb | CB TERMINAL NEW YORK OFFICE USA | ONLINE | NONE | 2009.11.10.13:55 | 1.3.1.4 |
| ... | ... | ... | ... | ... | ... |
| 01da | DA TERMINAL WASHINGTON D.C. OFFICE USA | ONLINE | BUSY | 2009.11.08.12:45 | 1.3.2.3 |
| 01db | DB TERMINAL WASHINGTON D.C. OFFICE USA | ONLINE | NONE | 2009.11.10.12:45 | 1.3.2.4 |
| ... | ... | ... | ... | ... | ... |

FIG.11

| REQUEST SOURCE TERMINAL ID | DESTINATION TERMINAL ID |
|---|---|
| 01aa | 01ab,・・・,01ba,01bb,・・・,01ca,01cb,・・・,01da,01db,・・・ |
| 01ab | 01aa,01ca,01cb |
| 01ba | 01aa,01ab,01ca,01cb,01da,01db |
| ... | ... |
| 01db | 01aa,01ab,01ba,・・・,01da,01ca,01cb,・・・,01da |
| ... | ... |

FIG.12

| SESSION ID | RELAY DEVICE ID | REQUEST SOURCE TERMINAL ID | DESTINATION TERMINAL ID | DELAY TIME (ms) | DELAY INFO. RECEPTION DATE/TIME |
|---|---|---|---|---|---|
| se1 | 111a | 01aa | 01bb,01cb,01db | 200 | 2009.11.10.14:00 |
| se2 | 111b | 01ba | 01ca | 50 | 2009.11.10.14:10 |
| se3 | 111d | 01bb | 01da | 400 | 2009.11.10.14:20 |
| ... | ... | ... | ... | ... | ... |

FIG.13

| DELAY TIME (ms) | IMAGE QUALITY OF VIDEO DATA |
|---|---|
| 0~100 | HIGH IMAGE QUALITY |
| 100~300 | MEDIUM IMAGE QUALITY |
| 300~500 | LOW IMAGE QUALITY |
| 500~ | (INTERRUPTED) |

FIG.14

| TERMINAL ID | RELAY DEVICE ID |
|---|---|
| 01aa | 111a |
| 01ab | 111a |
| ... | ... |
| 01ba | 111b |
| 01bb | 111b |
| ... | ... |
| 01ca | 111c |
| 01cb | 111c |
| ... | ... |
| 01da | 111d |
| 01db | 111d |
| ... | ... |

FIG.15

| MODIFICATION REQUEST INFO. | PRE-MODIFICATION STATE INFO. | MODIFICATION INFO. |
|---|---|---|
| CALL | NONE | ACCEPTED |
| JOIN | ACCEPTED | BUSY |
| LEAVE | BUSY | NONE |

FIG.16

| MODIFICATION REQUEST INFO. | TERMINAL INFO. | PRE-MODIFICATION STATE INFO. | MODIFICATION INFO. |
|---|---|---|---|
| INVITE | REQUEST SOURCE | NONE | CALLING |
| | DESTINATION | NONE | RINGING |
| | OWN TERMINAL SELECTION | NONE | ACCEPTED |
| ACCEPT | REQUEST SOURCE | CALLING | ACCEPTED |
| | | ACCEPTED | ACCEPTED |
| | DESTINATION | RINGING | ACCEPTED |
| CANCEL | REQUEST SOURCE | ACCEPTED | ACCEPTED |
| | | CALLING | NONE |
| | DESTINATION | RINGING | NONE |

FIG.17

| MODIFICATION REQUEST INFO. | TERMINAL INFO. | ASSESSMENT INFO. | PRE-MODIFICATION STATE INFO. | MODIFICATION INFO. |
|---|---|---|---|---|
| REJECT | REQUEST SOURCE | PART | CALLING | CALLING |
| | | ALL | CALLING | NONE |
| | | PART | ACCEPTED | ACCEPTED |
| | DESTINATION | | RINGING | NONE |

FIG.21

| TERMINAL ID | PASSWORD |
|---|---|
| 01aa | aaaa |
| 01ab | abab |
| 01ba | baba |
| ... | ... |

FIG.22

| source_dc | destination_dc | roster | log | user_profile |
|---|---|---|---|---|
| 80ab | 80ef | true | true | true |
| 80ab | 80cd | false | false | true |
| 80ef | 80ab | true | true | true |
| 80ef | 80cd | false | false | true |
| 80cd | 80ab | false | false | true |
| 80cd | 80ef | false | false | true |

INFORMATION PROCESSING APPARATUS, ACCESS CONTROL METHOD, AND COMMUNICATION SYSTEM

BACKGROUND OF THE INVENTION

1. Field of the Invention

The present invention relates to a communication system to transmit content data.

2. Description of the Related Art

Recently, with the demand for reducing time and expenses for business trips, a videoconference system is becoming increasingly popular. The videoconference system is a transmission system to communicate over a communication network such as the Internet and conduct videoconferences via the communication network. In the videoconference system, the videoconference may be implemented by transmitting and receiving telecommunication data such as image data and voice data between two or more terminals at different locations.

In a case in which the two terminals at different locations start communicating and the communications are conducted via Internet Protocol (IP) telephones (i.e., one of telephone services), the Session Initiation Protocol (SIP) is generally utilized as a communication protocol for establishing a session between the two terminals. With this communication protocol (i.e., SIP), the SIP server controls a call between the terminals (i.e., a call is established between the terminals by exchanging call information between them). Once the session has been established between the terminals, they are instantly in communication and the transmission of voice data between the terminals becomes possible.

Meanwhile, in a case of OAuth 2.0 (which is the open standard for authorization according to the related art), a client receives an access token and the access token enables the client to access a protection resource. The access token is issued to the client by an authorization server, and the access token may include the authorization of an owner of the protection resource. The client uses an access token to access a protection resource provided in a resource server.

In a distributed authentication system according to the related art, a plurality of authentication servers are provided for distributing load and the distributed authentication system is adapted to identify an authentication server that has issued authentication information among the authentication servers. For example, see Japanese Laid-Open Patent Publication No. 2005-301424.

Information processing apparatuses, such as data centers in which various servers including an authorization server and an application programming interface (API) server are installed, are arranged at different locations. In each data center, an access token is issued to a terminal by the authorization server. Before requesting issue of an access token to the authorization server of the data center first, a call control is performed between the terminal and a call control server of the data center. After receiving the access token issued by the data center, the terminal may use the access token to access a protection resource of another data center. Hence, the merit of the availability of the system is maintained. In this case, the data center including the call control server to perform the call control of the terminal may be inconsistent with or different from the data center including the protection resource to be accessed by the terminal.

Here, a case in which a protection resource accessing of which is managed by a first data center is isolated from a second data center different from the first data center is considered. When a terminal accesses the protection resource of the first data center using the access token issued by the second data center, the terminal is connectable with the call control server of the second data center and the protection resource of the first data center. Hence, there is a risk that the protection resource will leak out from the call control server of the second data center.

SUMMARY OF THE INVENTION

In one aspect, the present invention provides an information processing apparatus which is capable of preventing leakage of a protection resource accessing of which is managed by another information processing apparatus.

In an embodiment which solves or reduces one or more of the above-mentioned problems, the present invention provides an information processing apparatus including one or more processors, the processor including a reception unit configured to receive an access request transmitted from a terminal and addressed to a resource accessing of which is managed; an authority judgment unit configured to determine whether the access request has authority to access the resource based on an access token included in the access request and used to access the resource; and an access processing unit configured to permit the accessing of the resource when the authority judgment unit determines that the access request has the authority to access the resource, wherein the authority judgment unit determines whether the access request has the authority to access the resource based on a source apparatus having issued the access token and being included in the access token.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 6 is a diagram showing a destination list.

FIG. 7 is a diagram showing a modified quality management table.

FIG. 9 is a diagram showing a relay device management table.

FIG. 10 is a diagram showing a terminal management table.

FIG. 11 is a diagram showing a destination list management table.

FIG. 12 is a diagram showing a session management table.

FIG. 13 is a diagram showing a quality control management table.

FIG. 14 is a diagram showing a relay device assignment management table.

FIG. 15 is a diagram showing a state modification management table.

FIG. 16 is a diagram showing a state modification management table.

FIG. 17 is a diagram showing a state modification management table.

FIG. 21 is a diagram showing a terminal authentication management table.

FIG. 22 is a diagram showing an access propriety judgment table.

DETAILED DESCRIPTION OF THE PREFERRED EMBODIMENTS

A description will be given of embodiments with reference to the accompanying drawings.

Figure 1:
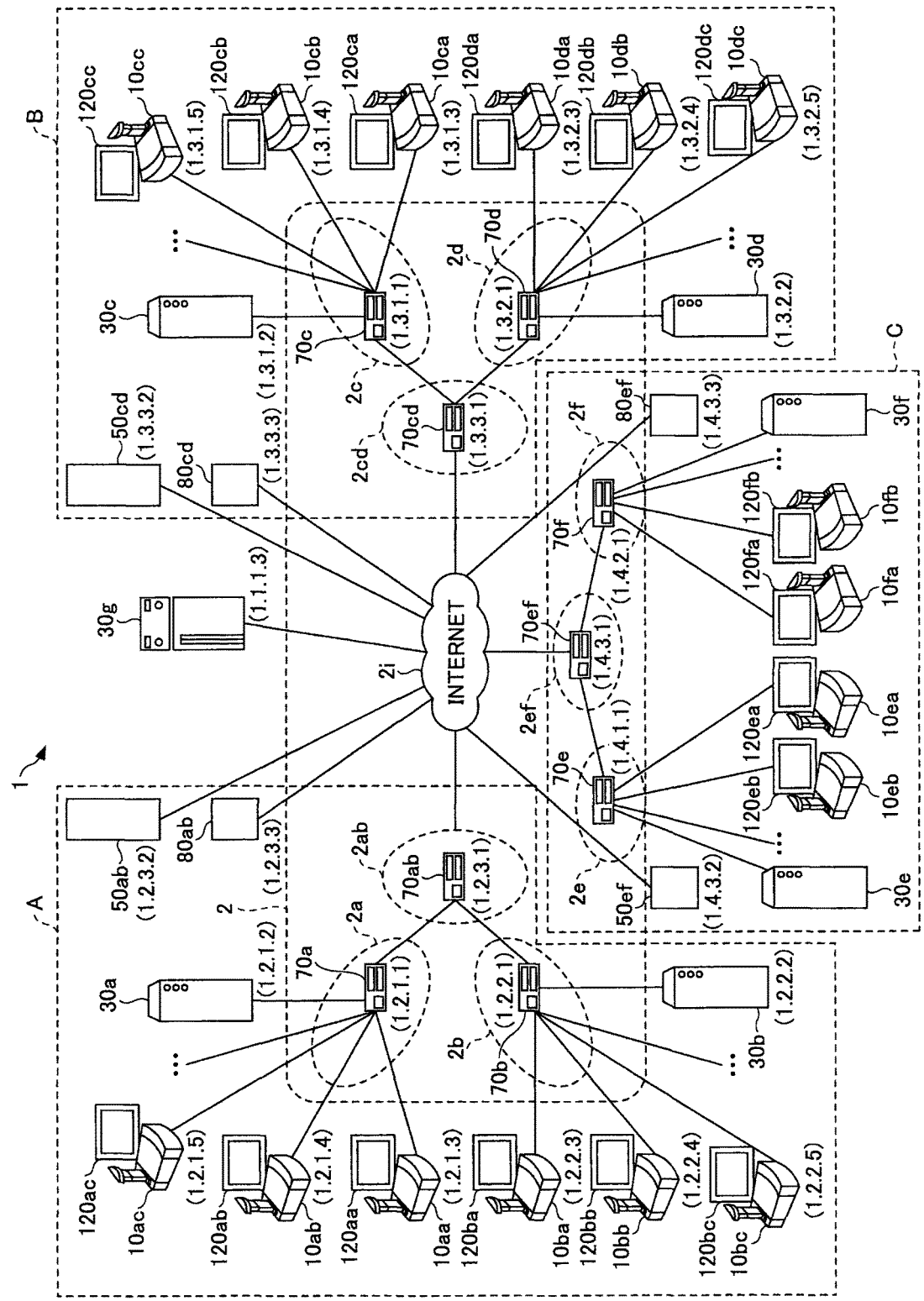
FIG. 1 is a schematic diagram of a transmission system according to an embodiment.

FIG. 1 is a schematic diagram of a transmission system 1 according to an embodiment. Initially, an outline of the transmission system 1 according to the embodiment is described with reference to FIG. 1.

There are various types of transmission systems. One example may be a data providing system in which content data are transmitted from one transmission terminal to another transmission terminal via a transmission management system in one-way direction. Another example may be a communication system in which information or emotional expressions are mutually communicated among two or more communication terminals via a transmission management system. The communication system is utilized for mutually exchanging information or emotional expressions among the two or more communication terminals (i.e., the transmission terminals) via a communication management system (i.e., the transmission management system). Examples of the communication system include a videoconference system, a videophone system, an audio conference system, a voice-call system, and a personal computer screen sharing system.

In the following embodiments, the transmission system, the transmission management system, and the transmission terminal are described by conceptualizing the videoconference system as an example of the communication system, the video conference terminal as an example of the transmission terminal, and the videoconference management system as an example of the communication management system. That is, the transmission terminal and the transmission management system utilized in this embodiment may be applied not only to the videoconference system, but may also be applied to the communication system or the transmission system.

As shown in FIG. 1, the transmission system 1 includes two or more transmission terminals (10aa, 10ab, . . . ), displays (120aa, 120ab, . . . ) for the transmission terminals (10aa, 10ab, . . . ), two or more relay devices (30a, 30b, 30c, 30d, 30e, 30f, 30g), transmission management systems (50ab, 50cd, 50ef), and data centers (80ab, 80cd, 80ef).

Note that, in this embodiment, any one of the transmission terminals (10aa, 10ab, . . . ) may be referred to as a "transmission terminal 10", any one of the displays (120aa, 120ab, . . . ) may be referred to as a "display 120", any one of the relay devices (30a, 30b, 30c, 30d, 30e, 30f, 30g) may be referred to as a "relay device 30", any one of the transmission management systems (50ab, 50cd, 50ef) may be referred to as a "transmission management system 50", and any one of the data centers (80ab, 80cd, 80ef) may be referred to as a "data center 80".

The transmission terminal 10 is configured to transmit and receive image data and voice data as examples of content data. Note that, in the following, the "transmission terminal" and the "transmission management system" may be simply called as the "terminal" and the "management system", respectively.

The communications in this embodiment not only include transmission and reception of voice data but also include transmission and reception of image data. That is, the terminal 10 in this embodiment transmits and receives image data and voice data. However, the terminal 10 may transmit and receive the voice data alone without transmitting or receiving the image data.

In this embodiment, dynamic image data (i.e., video data) are illustrated as an example of the image data; however, the image data may also be static image data. Or, the image data may include both the dynamic and the static image data. The relay device 30 is configured to relay the image data and the voice data among the terminals 10. The management system 50 is configured to manage the terminal 10 and the relay device 30 in an integrated fashion.

Routers (70a, 70b, 70c, 70d, 70e, 70f, 70ab, 70cd, 70ef) shown in FIG. 1 are configured to select optimal paths for the image data and the voice data. Note that, in this embodiment, any one of the routers (70a, 70b, 70c, 70d, 70e, 70f, 70ab, 70cd, 70ef) may be simply called as a "router 70".

The terminals (10aa, 10ab, 10ac, 10a . . . ), the relay device 30a, and the router 70a are connected via a LAN 2a so that they may communicate with one another. The terminals (10ba, 10bb, 10bc, 10b . . . ), the relay device 30b, and the router 70b are connected via a LAN 2b so that they may communicate with one another. As shown in FIG. 1, the LAN 2a and the LAN 2b are set up in a predetermined area A. In the area A, the LAN 2a and the LAN 2b are connected via a dedicated line 2ab including the router 70ab so that they may communicate with one another. For example, the area A may be Japan, the LAN 2a may be set up in the Tokyo office, and the LAN 2b may be set up in the Osaka office.

The terminals (10ca, 10cb, 10cc, 10c . . . ), the relay device 30c, and the router 70c are connected via a LAN 2c so that they may communicate with one another. The terminals (10da, 10db, 10dc, 10d . . . ), the relay device 30d, and the router 70d are connected via a LAN 2d so that they may communicate with one another. Further, the LAN 2c and the LAN 2d are set up in a predetermined area B. In the area B, the LAN 2c and the LAN 2d are connected via a dedicated line 2cd including the router 70cd so that they may communicate with one another. For example, the area B may be a foreign country B, and the LAN 2c and the LAN 2d may be set up in business offices located in cities of the foreign country B.

The terminals (10ea, 10eb, 10e . . . ), the relay device 30e, and the router 70e are connected via a LAN 2e so that they may communicate with one another. The terminals (10fa, 10fb, 10f . . . ), the relay device 30f, and the router 70f are connected via a LAN 2f so that they may communicate with one another. Further, the LAN 2e and the LAN 2f are set up in a predetermined area C. In the area C, the LAN 2e and the LAN 2f are connected via a dedicated line 2ef including the router 70ef so that they may communicate with one another. For example, the area C may be a foreign country C, and the LAN 2e and the LAN 2f may be set up in business offices located in cities of the foreign country C. Note that the areas A, B and C are not only applicable to countries, but also applicable to any regions where the LAN may be set up.

The area A, the area B and the area C are connected from the respective routers 70ab, 70cd and 70ef via the Internet 2i so that the area A, the area B, and the area C may communicate with one another.

The management system 50 is connected to the terminal 10, the relay device 30 and the data center 80 via the Internet 2i so that they may communicate with one another. The management system 50 may be located in each of the area A, the area B and the area C, and may perform call control of the terminal 10.

The data center 80 is connected to the terminal 10, the relay device 30 and the data center 80 via the Internet 2i so that they may communicate with one another. The data center 80 may be located in each of the area A, the area B and the area C. An authorization server is installed in the data center 80, and the authorization server is configured to issue an access token to the terminal 10.

The relay device 30g is connected to the terminal 10 via the communication network 2 so that they may communicate with each other. The relay device 30g is constantly operating. The relay device 30g may be located in an area other than the areas A to C to avoid being affected by the communications in the local areas of the areas A to C. Hence, when the terminal 10 intends to communicate with a terminal in another local area, the relay device 30g may be utilized for relaying the communication data between the two terminals in different local areas. Further, the relay device 30g may also be used as an emergency relay device when the terminals located in the same local area intend to communicate with each other but the relay device located in that local area is not operating.

Note that, in this embodiment, the communication network 2 is made up of the LAN 2a, the LAN 2b, the dedicated line 2ab, the Internet 2i, the dedicated line 2cd, the LAN 2c, the LAN 2d, the dedicated line 2ef, the LAN 2e, and the LAN 2f. In the communication network 2, the communications are typically carried out via wire, but may be partially carried out wirelessly.

In FIG. 1, the set of four numerals attached below each of the terminal 10, the relay device 30, the management system 50, the router 70, and the data center 80 simply indicates the IP address of the typical IPv4. For example, the IP address of the terminal 10aa is "1.2.1.3" as indicated in FIG. 1. The IP address may be the IPv6; however, in this embodiment, the IPv4 is used for simplifying the description.

In this embodiment, the protection resources accessing of which is managed by the data center 80cd are isolated from the access management by the data centers 80ab and 80ef other than the data center 80cd. That is, the user is prevented from accessing a specific protection resource (among the protection resources accessing of which is managed by the data center 80cd) using other access tokens different from an access token issued by the data center 80cd. The user is permitted to access the protection resource accessing of which is managed by the data center 80ef (destination) using an access token issued by the data center 80ab (source). Similarly, the user is permitted to access the protection resource accessing of which is managed by the data center 80ab (destination) using an access token issued by the data center 80ef (source). However, the user is prevented from accessing the protection resource accessing of which is managed by the data center 80cd (destination) using an access token issued by the data center 80ab or 80ef (source). Similarly, the user is prevented from accessing the protection resource accessing of which is managed by the data center 80ab or 80ef (destination) using an access token issued by the data center 80cd (source).

Here, a case in which each terminal 10 is permitted to access the protection resource accessing of which is managed by the data center 80cd using an access token issued by the data center 80ab or 80ef is considered. The call control of the terminal 10 located in the area A is performed by the management system 50ab of the area A in which the data center 80ab is provided. When the terminal 10 located in the area A accesses the protection resource accessing of which is managed by the data center 80cd using the access token issued by the data center 80ab, the terminal 10 is connected to both the management system 50ab and the protection resources accessing of which is managed by the data center 80cd. In this case, there is a risk that the protection resource will leak out from the management system 50ab. Moreover, the call control of the terminal 10 located in the area C is performed by the management system 50ef of the area C in which the data center 80ef is provided. When the terminal 10 located in the area C accesses the protection resource accessing of which is managed by the data center 80cd using the access token issued by the data center 80ef, the terminal 10 is connected to both the management system 50ef and the protection resource accessing of which is managed by the data center 80cd. In this case, there is a risk that the protection resource will leak out from the management system 50ef.

To avoid the problem, in this embodiment, when the terminal 10 accesses the protection resource accessing of which is managed by the data center 80cd using the access token issued by the data center 80ab or 80ef, the data center 80cd rejects an access request received from the terminal 10. At the same time, the data center 80cd urges the terminal 10 to receive an access token from the data center 80cd. Thereby, the call control between the terminal 10 and the management system 50cd of the area B where the data center 80cd is arranged is performed, and the terminal 10 can receive the access token from the data center 80cd. The call control of the terminal 10 is performed by the management system 50cd in the area B where the data center 80cd is arranged. Hence, although the terminal 10 is connected to both the management system 50cd and the protection resource accessing of which is managed by the data center 80cd, the management system 50cd and the data center 80cd are located in the area B, and the protection resource does not leak out from the management systems 50ab and 50ef.

Next, a hardware configuration of the transmission system 1 according to the embodiment is described.

Figure 2:
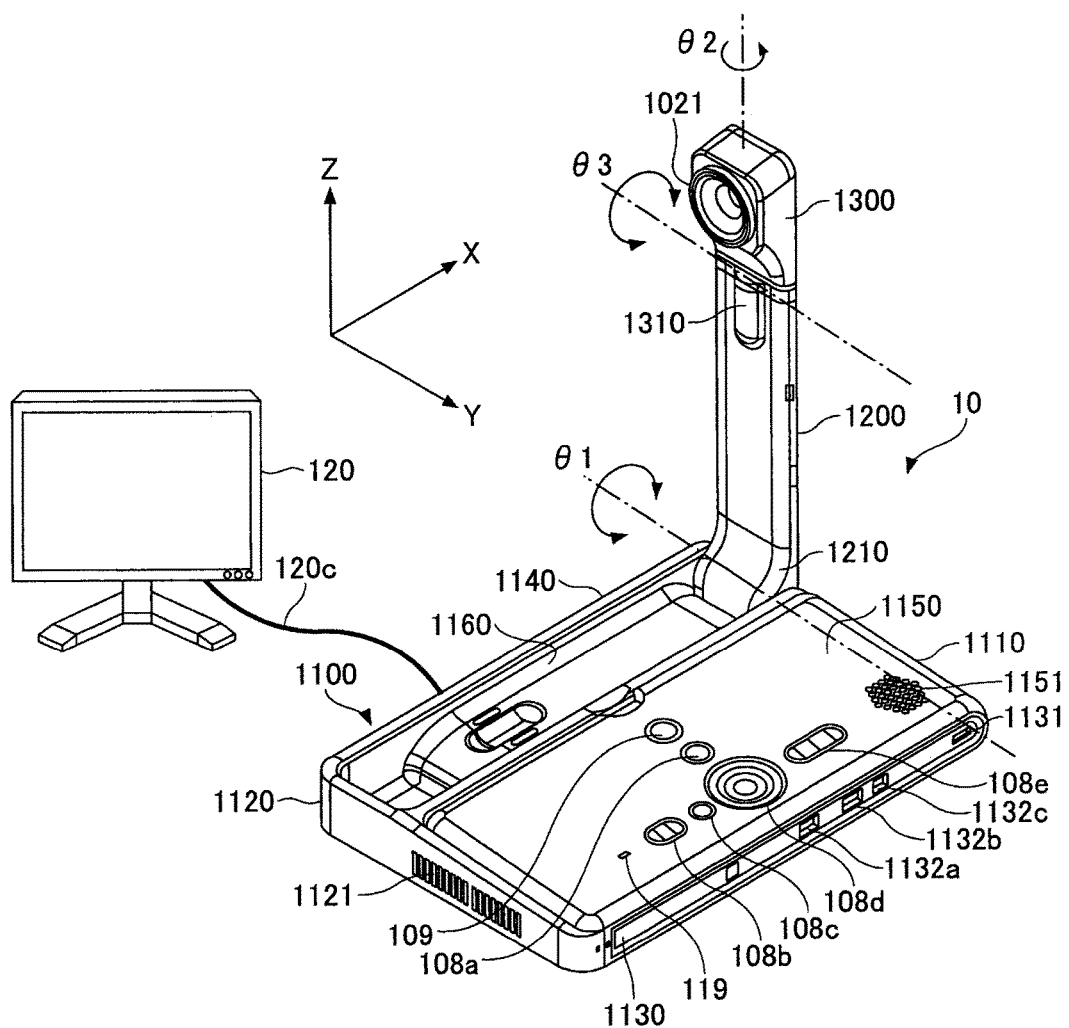
FIG. 2 is a perspective view of a transmission terminal in the transmission system according to the embodiment.

FIG. 2 is a perspective view of the terminal 10 in the transmission system 1 according to the embodiment. Note that, in FIG. 2, an X-axis direction represents a longitudinal direction of the terminal 10, a Y-axis direction represents a direction perpendicular to the X-axis direction in a horizontal plane, and a Z-axis direction represents a direction perpendicular to the X-axis direction and the Y-axis direction (i.e., vertical direction).

As shown in FIG. 2, the terminal 10 includes a housing 1100, an arm 1200, and a camera housing 1300. A front wall face 1110 of the housing 1100 includes a not-illustrated air intake face which is formed with two or more air intake holes, and a rear wall face 1120 of the housing 1100 includes an exhaust face 1121 which is formed with two or more exhaust holes. Accordingly, by driving a cooling fan arranged in the housing 1100, the terminal 10 can take in external air behind the terminal 10 via the air intake face and exhaust the air inside the terminal 10 via the exhaust face 1121. A right-side wall face 1130 of the housing 1100 is formed with a sound collecting hole 1131, via which a built-in microphone 114 (FIG. 3) can pick up audio waves, such as voice, sound, or noise.

Figure 4:
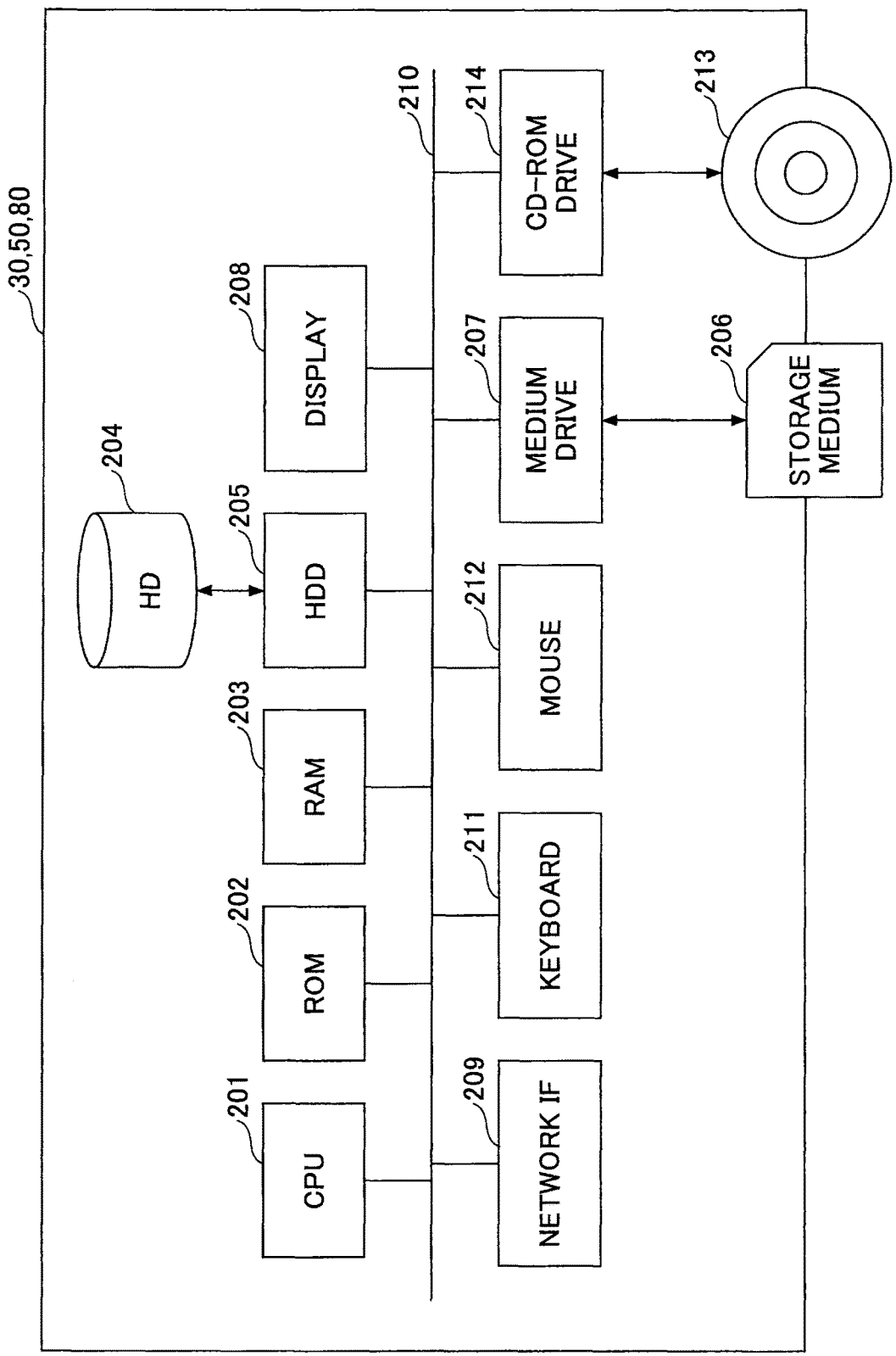
FIG. 4 is a block diagram showing a hardware configuration of a relay device, a transmission management system, or a data center in the transmission system according to the embodiment.

The right-side wall face 1130 of the housing 1100 includes an operation panel 1150. The operation panel 1150 includes operation buttons (108a-108e), a power switch 109, an alarm lamp 119, and a voice output face 1151. The voice output face 1151 is formed with voice output holes for outputting voice from a built-in speaker 115 (FIG. 4). Further, a left-side wall face 1140 of the housing 1100 includes an accommodation unit 1160 which is a recessed seating unit for accommodating the arm 1200 and the camera housing 1300. The right-side wall face 1130 of the housing 1100 further includes connection ports (1132a-1132c) for electrically connecting a cable to an external device connection interface (IF) 118. On the other hand, the left-side wall face 1140 of the housing 1100 includes a not-illustrated connection port for electrically connecting a cable 120c of the display 120 to the external device connection interface (IF) 118.

Note that, in the following, any one of the operation buttons (108a-108e) may be called an operation button 108 and any one of the connection ports (1132a-1132c) may be called a connection port 1132.

Next, the arm 1200 is attached to the housing 1100 via a torque hinge 1210 such that the arm 1200 is movable in upward and downward directions within a range of tilt angle $\theta 1$ of 135 degrees with respect to the housing 1100. The arm 1200 shown in FIG. 2 is in a state where the tilt angle $\theta 1$ is 90 degrees.

The camera housing 1300 includes a built-in camera 1021, and the camera 1021 is configured to take images of a user, documents, a room, etc. The camera housing 1300 further includes a torque hinge 1310. The camera housing 1300 is attached to the arm 1200 via the torque hinge 1310. The camera housing 1300 is rotationally attached to the arm 1200 in upward and downward directions via the torque hinge 1310 such that the camera housing 1300 is movable in the up, down, right and left directions in a range of pan angle $\theta 2$ of ±180 degrees and in a range of tilt angle $\theta 3$ of ±45 degrees when the pan angle and the tilt angle in the state shown in FIG. 2 are 0 degrees.

Note that an external appearance of each of the relay device 30, the management system 50, and the data center 80 is essentially the same as that of a general-purpose server computer, and a description thereof will be omitted.

Figure 3:
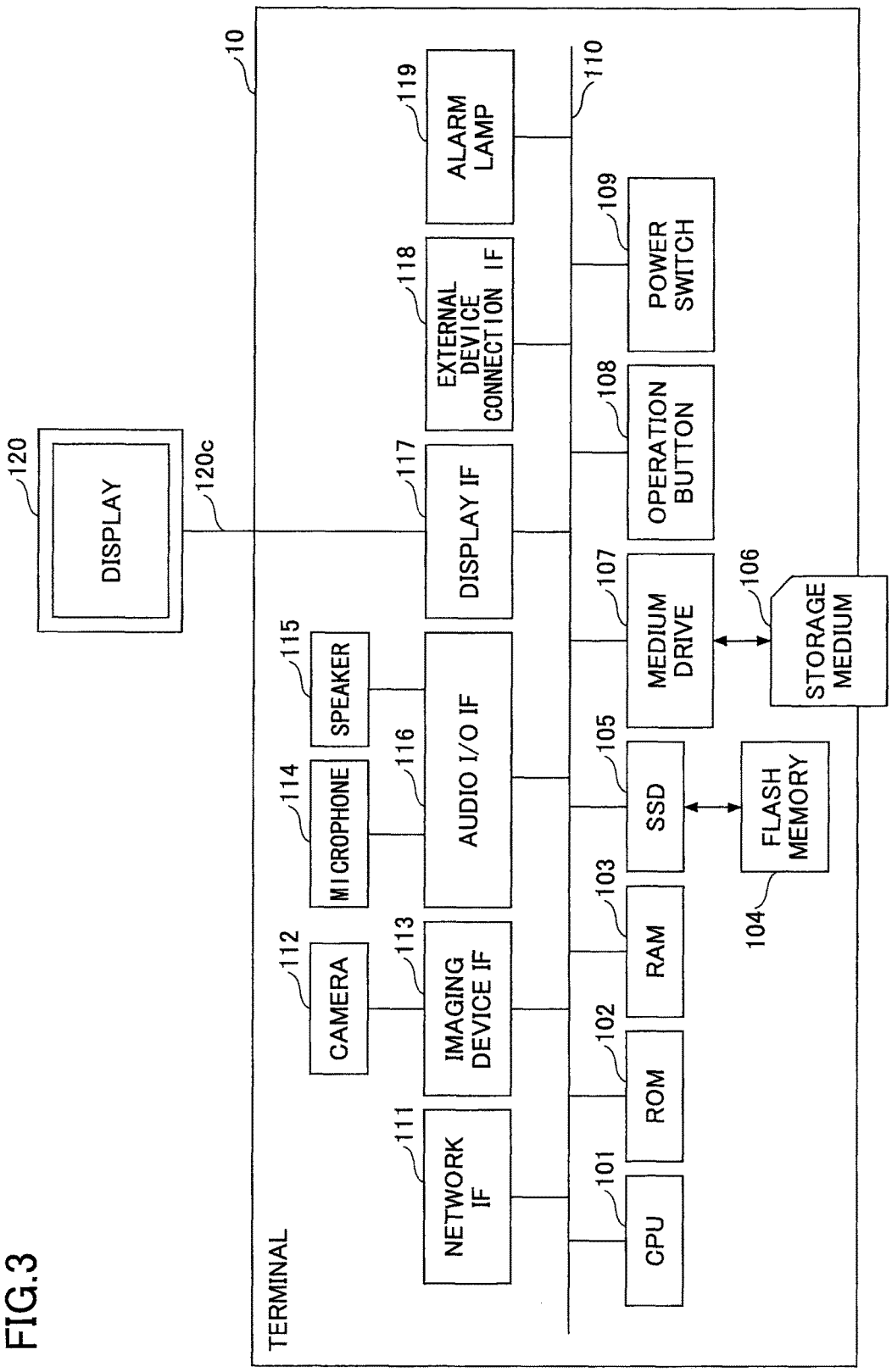
FIG. 3 is a block diagram showing a hardware configuration of the transmission terminal.

FIG. 3 is a block diagram showing a hardware configuration of the terminal 10 in the transmission system 1 according to the embodiment. As shown in FIG. 3, the terminal 10 includes a central processing unit (CPU) 101 configured to control overall operations of the terminal 10, a read-only memory (ROM) 102 storing programs for the terminal, a random access memory (RAM) 103 used as a work area of the CPU 101, a flash memory 104 configured to store various data, such as image data and voice data, a solid state drive (SSD) 105 configured to control retrieval and writing (storing) of the various data in the flash memory 104 and the like based on the control of the CPU 101, a medium drive 107 configured to control retrieval and writing (storing) of data into a storage medium 106 such as a flash memory, the operation button 108 operated by a user for selecting an address of the terminal 10, the power switch 109 for switching ON/OFF of the power of the terminal 10, and a network interface (IF) 111 for transmitting data utilizing the communication network 2.

The terminal 10 further includes a built-in camera 112 configured to image a subject based on the control of the CPU 101, an image sensor interface (IF) 113 configured to control driving of the camera 112, the built-in microphone 114 configured to pick up audio sound, the built-in speaker 115, a voice input/output interface (I/O IF) 116, a display interface (IF) 117 configured to transmit image data to the external display 120 based on the control of the CPU 101, the external device connection interface (IF) 118 configured to connect various external devices to the connection ports (1132a to 1132c) shown in FIG. 2, the alarm lamp 119 configured to inform the user of various functional problems of the terminal 10, and a bus line 110 such as an address bus or a data bus for electrically connecting the elements and devices with one another as shown in FIG. 3 via the bus line 110.

The display 120 is formed of liquid crystal or an organic EL material configured to display images of the subject or icons for operating the terminal 10. Further, the display 120 is connected to the display IF 117 via the cable 120c (see FIG. 3). The cable 120c may be an analog RGB (VGA) cable, a component video cable, a high-definition multimedia interface (HDMI) cable or a digital video interface (DVI) cable.

The camera 112 includes lenses and a solid-state image sensor configured to convert light into electric charges to produce digital images (videos) of the subject. Examples of the solid-state image sensor include a complementary metal oxide semiconductor (CMOS) or a charge coupled device (CCD).

The external device connection IF 118 may be connected via a universal serial bus (USB) cable with external devices, such as the external camera, the external microphone, and the external speaker. The USB cable is inserted in the connection port 1132 of the housing 1100 shown in FIG. 2. When the external camera is connected to the external device connection IF 118 via the USB cable, the external camera is driven in priority to the built-in camera 112 according to control of the CPU 101. Similarly, when the external microphone or the external speaker is connected, the external microphone or the external speaker is driven in priority to the built-in microphone 114 or the built-in speaker 115 according to control of the CPU 101.

Note that the storage medium 106 is removable from the terminal 10. In addition, if the storage medium 106 is a non-volatile memory configured to retrieve or write data based on the control of the CPU 101, the storage medium 106 is not limited to the flash memory 104, and may be an electrically erasable and programmable ROM (EEPROM).

The above-described programs for the terminal may be recorded in an installable format or in an executable format on a computer-readable recording medium such as the storage medium 106 to distribute the medium.

FIG. 4 is a block diagram showing a hardware configuration of the management system 50 in the transmission system 1 according to the embodiment. As shown in FIG. 4, the management system 50 includes a central processing unit (CPU) 201 configured to control overall operations of the management system 50, a read-only memory (ROM) 202 storing programs for the transmission management, a random access memory (RAM) 203 utilized as a work area of the CPU 201, a hard disk (HD) 204 configured to store various data, a hard disk drive (HDD) 205 configured to control retrieval and writing (storing) of the various data in the HD 204 based on the control of the CPU 201, a medium drive 207 configured to control retrieval and writing (storing) of data into a storage medium 206 such as a flash memory, a display 208 configured to display various information such as a cursor, menus, windows, characters and images, a network interface (IF) 209 for transmitting data utilizing the later-described communication network 2, a keyboard 211 including plural keys for inputting the characters, numerals, and various instructions, a mouse 212 for selecting or executing various instructions, selecting items to be processed, and moving the cursor, a CD-ROM drive 214 configured to control retrieval or writing of data in a compact disk read-only memory (CD-ROM) 213 as an example of a removable recording medium, a clock 215 configured to output date/time data, and a bus line 210 such as an address bus or a data bus for electrically connecting the elements and devices with one another shown in FIG. 5 via the bus line 210.

Note that the above-described programs for the management system may be in an installable format or in an executable format on a computer-readable recording medium such as the storage medium 206 or the CD-ROM 213 to distribute the medium.

Further, the relay device 30 has a hardware configuration similar to that of the management system 50, and a description of the hardware configuration of the relay device 30 will be omitted. Note that the ROM 202 may store programs for controlling the relay device 30. In this case, the programs for the relay device may also be recorded in an installable format or in an executable format on a computer-readable recording medium such as the storage medium 206 or the CD-ROM 213 to distribute the medium.

Further, the authorization server of the data center 80 has a hardware configuration similar to that of the management system 50, and a description of the hardware configuration of the authorization server of the data center 80 will be omitted. Note that the ROM 202 may store programs for controlling the authorization server of the data center 80. In this case, the programs for controlling the authorization server of the data center 80 may also be recorded in an installable format or in an executable format on a computer-readable recording medium such as the storage medium 206 or the CD-ROM 213 to distribute the medium. Note that other examples of the removable recording medium include a compact disc recordable (CD-R), a digital versatile disk (DVD), and a Blu-ray Disc (BD).

Next, a functional configuration of the transmission system 1 according to the embodiment is described.

Figure 5:
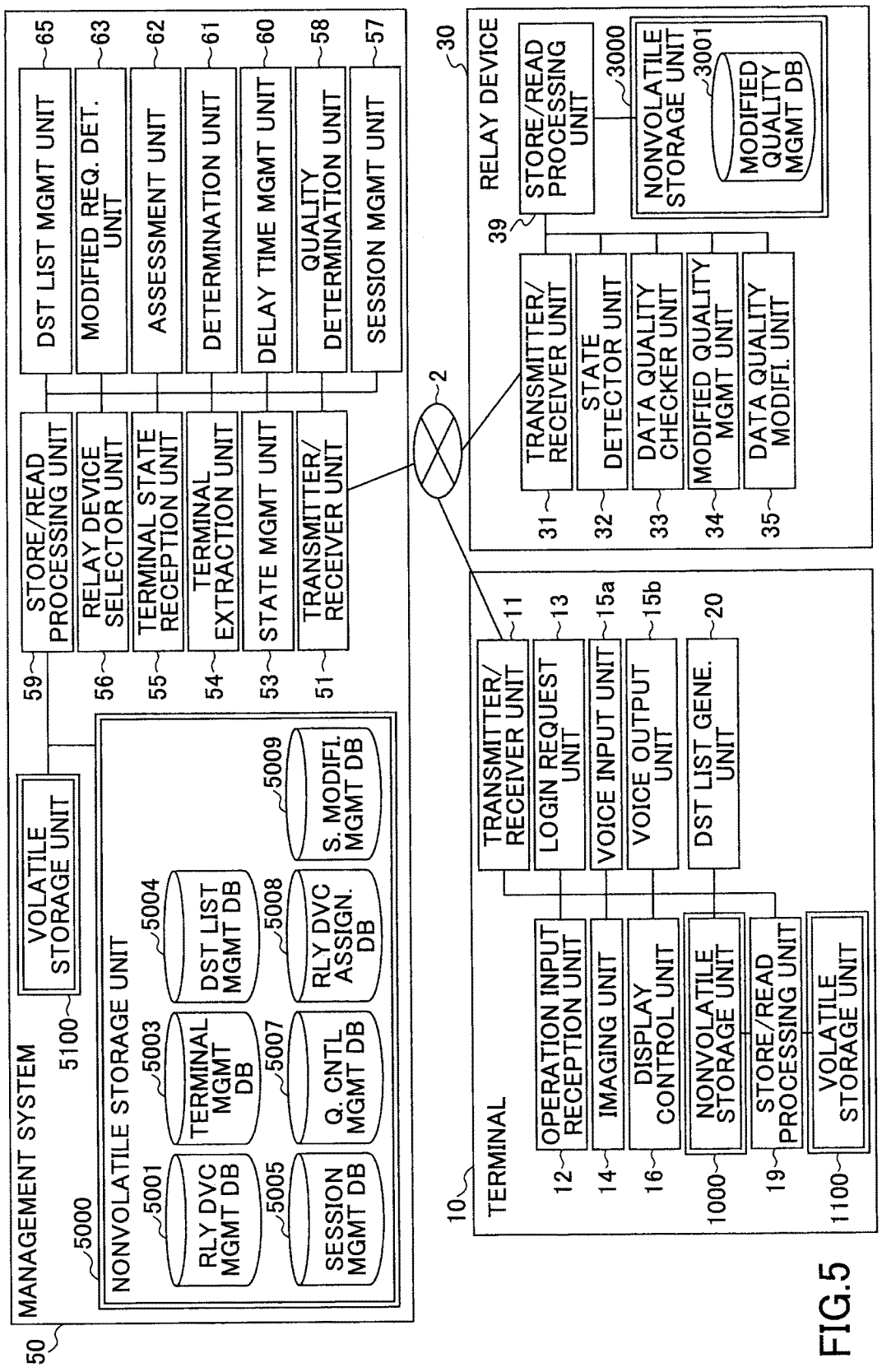
FIG. 5 is a block diagram showing a functional configuration of the terminal, the relay device, and the management system which constitute the transmission system according to the embodiment.

FIG. 5 is a block diagram showing a functional configuration of the terminal 10, the relay device 30, and the management system 50 which constitute the transmission system 1 according to the embodiment. In FIG. 5, the terminal 10, the relay device 30, and the management system 50 are connected via the communication network 2 so that they perform data communications with one another via the communication network 2.

As shown in FIG. 5, the terminal 10 includes a transmitter/receiver unit 11, an operation input reception unit 12, a login request unit 13, an imaging unit 14, a voice input unit 15a, a voice output unit 15b, a display control unit 16, a store/read processing unit 19, and a destination list generation unit 20. These units represent functions and units which are implemented by any of the elements and devices shown in FIG. 3, which are activated by instructions from the CPU 101 based on the programs stored in the ROM 102. Further, the terminal 10 further includes a nonvolatile storage unit 1000 formed of the flash memory 104 shown in FIG. 3, and a volatile storage unit 1100 formed of the RAM 103 shown in FIG. 3.

Next, a functional configuration of the terminal 10 is described. The transmitter/receiver unit 11 of the terminal 10 is configured to transmit various data (information) to and receive such data from other terminals, devices or systems via the communication network 2. The function of the transmitter/receiver unit 11 may be implemented by the network IF 111 shown in FIG. 3. The transmitter/receiver unit 1 starts receiving state information indicating the state of each of destination candidate terminals from the management system 50 before initiating communication with desired destination terminals. Note that the state information not only indicates an operating state (an on-line or off-line state) of each terminal 10 but also indicates a detailed state such as an engaging or waiting state during the terminal 10 being online. The state information further includes various states in addition to the operating state of the terminal 10, examples of which include a state of disconnected cables from the terminal 10, a state of incapability of outputting images while outputting sound, and a mute state of incapability of outputting sound. The following example illustrates a case where the state information is the operating state of the terminal 10.

The operation input reception unit 12 is configured to receive various inputs from the user. This function of the operation input reception unit 12 may be implemented by the operation button 108 and the power switch 109 shown in FIG. 3. For example, when the user switches ON the power switch 109 shown in FIG. 3, the operation input reception unit 12 shown in FIG. 5 receives a power-ON signal to switch ON the power of the terminal 10.

The login request unit 13 is configured to automatically transmit login request information indicating that the user desires to login, and a current IP address of the terminal 10 as an IP address of a request source terminal from the transmitter/receiver unit 11 to the management system 50 via the communication network 2 when the power-ON signal is received by the operation input reception unit 12 as a trigger. The function of the login request unit 13 may be implemented by instructions received from the CPU 101 shown in FIG. 3. Further, when the user switches OFF the power switch 109, the transmitter/receiver unit 11 transmits power off state information to the management system 50, and the operation input reception unit 12 subsequently turns OFF the power of the terminal 10 completely. Accordingly, the management system 50 may detect a power state of the terminal 10 as an OFF state.

The imaging unit 14 is configured to take an image of a subject and output image data of the subject. The function of the imaging unit 14 may be implemented by instructions received from the CPU 101 shown in FIG. 3, and also by the camera 112 and the imaging device IF 113 shown in FIG. 3. The voice input unit 15a is configured to input voice data of the voice signal obtained by the microphone 114 which converts voice of the user into the voice signal. The function of the voice input unit 15a may be implemented by the voice input/output IF 116 shown in FIG. 3. The voice output unit 15*b* is configured to output a voice signal corresponding to the voice data to the speaker 115 and cause the speaker 115 to produce sound or voice according to the voice signal. The function of the voice output unit 15*b* may be implemented by instructions received from the CPU 101 shown in FIG. 3 and the voice input/output IF 116 shown in FIG. 3.

The display control unit 16 is configured to control transmission of the image data to the external display 120. The function of the display control unit 16 may be implemented by the display IF 117 shown in FIG. 3. The display control unit 16 controls the display 120 such that the display 120 displays the destination list including names of destination terminals to which corresponding state information items of the destination terminals received by the transmitter/receiver unit 11 are reflected before the terminal 10 as the request source terminal initiates videoconferencing communication with the desired destination terminals.

For example, the display 120 displays a destination list frame 1100-1 shown in FIG. 6. As shown in FIG. 6, the destination list frame 1100-1 includes names of the destination terminals such as "AB TERMINAL TOKYO OFFICE JAPAN" 1100-2, and icons (1100-3*a*, 1100-3*b*, 1100-3*c*, 1100-3*d*) of state information items for corresponding destination terminal names. The icon 1100-3*a* represents a state in which one of destination candidate terminals is in an online and standby state, which indicates that this destination candidate terminal is ready to receive a call. The icon 1100-3*b* represents a state in which one of destination candidate terminals is in an offline state, which indicates that this destination candidate terminal is unable to receive a call. The icon 1100-3*c* represents a state in which one of destination candidate terminals is already talking to another terminal and is in an engaged state, which indicates that this destination candidate terminal is ready to receive another call in addition to the call already received (i.e., ready to accept a three-party communication). The icon 1100-3*d* represents a state in which one of destination candidate terminals is calling another terminal or is being called from another terminal, which indicates that this destination candidate terminal is unable to receive a call from other terminals. The icon 1100-3*d* further represents a state in which this destination candidate terminal is unable to receive a call from the other terminals since the destination candidate terminal has authorized the call from another terminal or being authorized by another terminal. Further, the destination list frame 1100-1 includes a scroll bar 11-4 on its right-hand side, and icons indicating undisplayed destination names and their states of the destination candidate terminals in FIG. 6 will appear by selecting an upward-pointing triangular icon or a downward-pointing triangular icon.

The store/read processing unit 19 is configured to store various data in the nonvolatile storage unit 1000 or read various data from the nonvolatile storage unit 1000. The function of the store/read processing unit 19 may be implemented by instructions received from the CPU 101 shown in FIG. 3 and also by the SSD 105 shown in FIG. 3 as an example. The nonvolatile storage unit 1000 stores a terminal identification (ID) and a password, and the like for identifying the terminal 10. The store/read processing unit 19 is configured to further store various data in the volatile storage unit 1100 and read various data from the volatile storage unit 1100. The store/read processing unit 19 overwrites the image data and the voice data in the volatile storage unit 1100 with new ones received from the destination terminal every time the terminal 10 talks to the destination terminals. Note that the display 120 displays previous image data before being overwritten with the new image data and the speaker 115 outputs previous voice data before being overwritten with the new voice data.

The destination list generation unit 20 is configured to generate and update the destination list as shown in FIG. 6 in which the states of the destination candidates are displayed with icons based on the destination list information and the state information of the terminal 10 as a destination candidate, received from the management system 50.

Note that the terminal ID and the relay device ID individually indicate identification information formed of language, characters, and various symbols that uniquely identify the terminal 10 and the relay device 30. The terminal ID and the relay device ID may be the identification information formed of a combination of two or more of the language, characters, and various symbols.

Next, a functional configuration of the relay device 30 is described. As shown in FIG. 5, the relay device 30 includes a transmitter/receiver unit 31, a state detector unit 32, a data quality checker unit 33, a modified quality management unit 34, a data quality modification unit 35, and a store/read processing unit 39. These units represent functions and units implemented by any of the elements and devices shown in FIG. 4, which are activated by instructions from the CPU 201 based on the programs stored in the ROM 202. Further, the relay device 30 further includes a nonvolatile storage unit 3000 formed of the HD 204 shown in FIG. 4, which is capable of maintaining the various data or information even when the power of the relay device 30 is turned off.

The nonvolatile storage unit 3000 includes a modified quality management database (DB) 3001 formed of a modified quality management table shown in FIG. 7. The modified quality management table includes IP addresses of the terminals 10 utilized as relay destination terminals in relation to image quality of the image data relayed by the respective terminals 10.

Figure 8C:
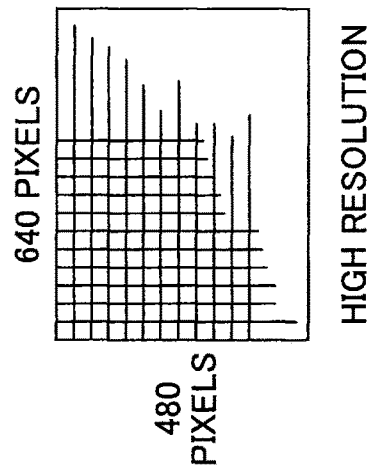
FIGS. 8A, 8B and 8C are diagrams for explaining image quality of image data.
Figure 8B:
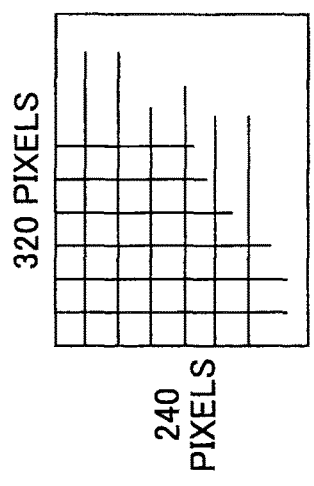
Figure 8A:
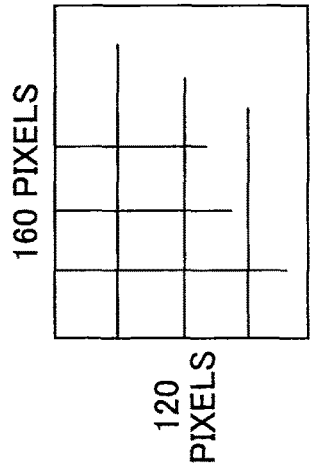

Herein, the resolutions of the image data treated in this embodiment are described. FIG. 8A represents a base image used as a low-resolution image formed of 160×120 pixels, FIG. 8B represents a medium-resolution image formed of 320×240 pixels, and FIG. 8C represents a high-resolution image formed of 640×480 pixels. When the image data are relayed via a narrowband path, the low-resolution image data used as the base image are relayed. When the image data are relayed via a relatively wide band path, the low-resolution image data used as the base image and the medium-resolution image data exhibiting medium image quality are relayed. When the image data are relayed via an extremely wide band path, the low-resolution image data used as the base image, the medium-resolution image data exhibiting the medium image quality, and the high-resolution image data exhibiting high image quality are relayed. For example, if the relay device 30 relays the image data addressed to the destination terminal having an IP address "1.3.2.4", the image quality of the image data relayed is "high image quality" as in the modified quality management table shown in FIG. 7.

Next, a functional configuration of the relay device 30 is described. Note that, in the following, the functions of the relay device 30 are described in association with the main elements and devices for implementing the units of the relay device 30 shown in FIG. 4.

The transmitter/receiver unit 31 of the relay device 30 shown in FIG. 5 is configured to transmit various data (information) to and receive such data from other terminals, relay devices and systems. The function of the transmitter/receiver unit 31 may be implemented by the network IF 209 shown in FIG. 4. The state detector unit 32 is configured to detect an operating state of the relay device 30 having the state detector unit 32. The function of the state detector unit 32 may be implemented by instructions from the CPU 201 shown in FIG. 4. The operating state may be "ONLINE", "OFFLINE" or "FAILED".

The data quality checker unit 33 is configured to search the modified quality management table (see FIG. 7) by the IP address of the destination terminal as a search key, and check image quality of the relayed image data by extracting the image quality for the corresponding image data to be relayed. The function of the data quality checker unit 33 may be implemented by instructions from the CPU 201 shown in FIG. 4. The modified quality management unit 34 is configured to modify content of the modified quality management table of the state modification management DB 3001 based on the later-described quality information transmitted from the management system 50. The function of the modified quality management unit 34 may be implemented by instructions from the CPU 201 shown in FIG. 4. For example, assume that while a videoconference is held between a request source terminal (terminal 10aa) having a terminal ID "01aa" and a destination terminal (terminal 10db) having a terminal ID "01db", another videoconference is initiated between a request source terminal (terminal 10bb) and a destination terminal (terminal 10ca) via the communication network 2. In this case, if the reception of the image data is delayed in the destination terminal (10db), the relay device 30 may need to degrade the image quality of the relayed image data from high image quality to medium image quality. In such a case, content of the modified quality management table of the state modification management DB 3001 is modified such that the quality of the image data relayed by the relay device 30 is degraded from the high image quality to the medium image quality.

The data quality modification unit 35 is configured to modify the image quality of the image data transmitted from the transmission source terminal 10 based on the modified content of the modified quality management table of the state modification management DB 3001. The function of the data quality modification unit 35 may be implemented by instructions from the CPU 201 shown in FIG. 4. The store/read processing unit 39 is configured to store various data in the nonvolatile storage unit 3000 and retrieve various data from the nonvolatile storage unit 3000. The function of the store/read processing unit 39 may be implemented by the HDD 205 shown in FIG. 4.

Next, a functional configuration of the management system 50 is described. As shown in FIG. 5, the management system 50 includes a transmitter/receiver unit 51, a state management unit 53, a terminal extraction unit 54, a terminal state reception unit 55, a relay device selector unit 56, a session management unit 57, a quality selector unit 58, a store/read processing unit 59, a delay time management unit 60, a determination unit 61, an assessment unit 62, a modified request determination unit 63, and a destination list management unit 65. These units represent functions and units which are implemented by the elements shown in FIG. 4 operated by instructions from the CPU 201 in accordance with the program stored in the ROM 202. Further, the management system 50 further includes a nonvolatile storage unit 5000 formed of the HD 204 shown in FIG. 4, which is capable of maintaining the various data or information even if the power of the management system 50 is switched OFF. The nonvolatile storage unit 5000 stores the destination list frame 1100-1 shown in FIG. 6. Further, the management system 50 includes a volatile storage unit 5100 formed of the RAM 203 shown in FIG. 4.

The nonvolatile storage unit 5000 includes a relay device management DB 5001 formed of a relay device management table shown in FIG. 9. In the relay device management table, the relay device IDs of the relay devices 30 are associated with the operating states of the relay devices 30, reception date/times at which the state information indicating the operating states of the relay devices 30 are received by the management system 50, the IP addresses of the relay devices 30, and the maximum data transmission speeds (Mbps) of the relay devices 30. For example, in the relay device management table shown in FIG. 9, the relay device 30a having the relay device ID "111a" is associated with the operating state "ONLINE", the reception date/time "2009.11.10.13:00" at which state information of the relay device 30a is received by the management system 50, the IP address "1.2.1.2" of the relay device 30a, and the maximum data transmission speed "100" (Mbps) of the relay device 30a.

The nonvolatile storage unit 5000 includes a terminal management DB 5003 formed of a terminal management table shown in FIG. 10. In the terminal management table, terminal IDs of the terminals 10 as destination terminals are associated with terminal names of the destination terminals 10, operating states of the destination terminals 10, communication states of the destination terminals 10 with other terminals, reception date/times at which the later-described login request information of the destination terminals 10 is received by the management system 50, and IP addresses of the destination terminals 10. For example, in the terminal management table shown in FIG. 10, the terminal 10aa having the terminal ID "01aa" is associated with the terminal name "AA TERMINAL TOKYO OFFICE JAPAN" of the terminal 10aa, the operating state "ONLINE" of the terminal 10aa, the communication state "NONE" indicating that the terminal 10aa is in a waiting state and not communicating with other terminals, the reception date/time "2009.11.10.13:40" at which the login request information of the terminal 10aa is received by the management system 50, and the IP address "1.2.1.3" of the terminal 10aa. Note that the communication state includes "CALLING" indicating a state where the terminal is calling another terminal, "RINGING" indicating a state where the terminal is being called, "ACCEPTED" indicating a state where the terminal has authorized a communication request from another terminal to or communication request of the terminal has been authorized, and a "BUSY" indicating a state where the terminal is engaged with communicating with another terminal.

The nonvolatile storage unit 5000 includes a destination list management DB 5004 formed of a destination list management table shown in FIG. 11. In the destination list management table, terminal IDs of registered destination candidate terminals are associated with the terminal IDs of the request source terminals that request initiation of a videoconference communication. For example, in the destination list management table shown in FIG. 11, the terminal ID "01aa" of the request source terminal 10aa is associated with a destination candidate terminal 10ab having a terminal ID "01ab", a destination candidate terminal 10ba having a terminal ID "01ba", a destination candidate terminal 10bb having a terminal ID "01bb" and the like, which the request source terminal requests to initiate the videoconference. The destination candidate terminals may be added or deleted based on instructions from the request source terminal to the management system 50.

The nonvolatile storage unit 5000 includes a session management DB 5005 formed of a session management table shown in FIG. 12. In the session management table, session IDs that identify sessions in which the communication data are transmitted and received between the terminals are associated with the relay device IDs of the relay devices 30 utilized for relaying the image data and the voice data, the terminal ID of the request source terminal 10, the terminal IDs of the destination terminals 10, delay time (ms) in receiving the image data by the destination terminals 10, and reception date/times at which the delay information indicating the delay time transmitted from each of the destination terminals is received by the management system 50. For example, in the session management table shown in FIG. 12, the relay device 30a (having the relay device ID "111a") selected for executing the session having the session ID "se1" is associated with the request source terminal 10aa having the terminal ID "01aa" that has a videoconference with the destination terminal 10bb having the terminal ID "01bb", the destination terminal 10cb having the terminal ID "01cb", and the destination terminal 10db having the terminal ID "01db". The session management table indicates that the relay device 30a relays the image data and the voice data between the request source terminal 10aa and the destination terminals 10bb, 10cb, and 10db, and delay time 200 ms in receiving the image data by the destination terminal 10db at the reception date/time "2009.11.10.14:00". Note that if the videoconference is conducted between the two terminals 10, the reception date/time of the delay information may be managed not based on the destination terminals but based on the delay information transmitted from the request source terminal. However, if the videoconference is conducted between three or more terminals 10, the reception date/time of the delay information may be managed based on the delay information transmitted from reception side terminals 10 which have received the image data and the voice data.

The nonvolatile storage unit 5000 includes a quality control management DB 5007 formed of a quality control management table shown in FIG. 13. In the quality control management table, the delay time (ms) in the request source terminal or the destination terminal is associated with the image quality (quality of image) of the image data relayed by the relay device 30.

The nonvolatile storage unit 5000 includes a relay device assignment management DB 5008 formed of a relay device assignment management table shown in FIG. 14. In the relay device assignment management table, relay device IDs of the relay devices utilized for relaying the image data and the voice data are individually associated with the terminal IDs of all the terminals managed by the management system 50.

The nonvolatile storage unit 5000 includes a state modification management DB 5009 formed of state modification management tables shown in FIGS. 15, 16 and 17. In the state modification management table shown in FIG. 15, modification request information (an example of modification information) indicating a request for modifying a communication state between the terminals is associated with pre-modification state information indicating a communication state before the communication state is modified by the state modification unit 53c (an example of an modification unit), and modification information indicating a modified state modified by the state modification unit 53c. In the state modification management table shown in FIG. 16, the modification request information is associated with terminal information for identifying the request source terminal and the destination terminal, the pre-modification state information, and the modification information. In the state modification management table shown in FIG. 17, the modification request information is associated with the terminal information, assessment information indicating an assessment result as to whether the modification request information "REJECT" indicating the rejecting the initiation of the communication is received from all the terminals that have received the modification request information "INVITE" indicating a request for initiating the communication when the modification request information "REJECT" is received from any one of the terminals that have received the modification request information "INVITE", the pre-modification information, and the modification information. Note that in addition to "REJECT" and "INVITE", the modification request information further includes "ACCEPT" indicating the authorization of the communication initiation, "CANCEL" indicating the cancellation of the communication initiation, "JOIN" indicating the initiation of relaying communication data, "CALL" indicating the participation in the established session between the terminals, and "LEAVE" indicating the end of the communication.

The relay device management table, the terminal management table, the destination list management table, the session management table, the quality control management table, the relay device assignment management table, and the state modification management table may be managed by setting them as protection resources accessing of which is restricted. Herein, the destination list management table is managed as a protection resource as an example. The destination list management table is an example of an address book. The information included in the destination list management tables managed by the management systems 50ab, 50cd and 50ef may differ from one another. Further, the destination list management table managed by the management system 50ab and the destination list management table managed by the management system 50ef may also be synchronized with each other.

Next, a functional configuration of the management system 50 is described. Note that, in the following, the functions of the management system 50 are described in association with the main elements and devices for implementing the units of the management system 50 shown in FIG. 4.

The transmitter/receiver unit 51 of the management system 50 is configured to transmit various data (information) to and receive such data from other terminals, relay devices, and systems. The function of the transmitter/receiver unit 51 may be implemented by the network IF 209 shown in FIG. 4.

Figure 18:
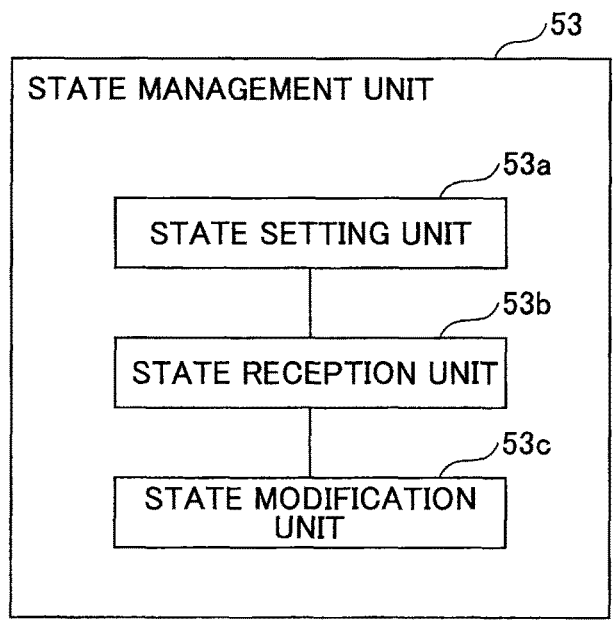
FIG. 18 is a block diagram showing a functional configuration of a state management unit.

The state management unit 53 is configured to manage the terminal management table (see FIG. 10) by associating the terminal ID the request source terminal that has requested for login with the operating state, time and date in receiving login request information by the management system 50 and the IP address of the request source terminal. Thus, as shown in FIG. 18, the state management unit 53 may implement a state setting unit 53a, a state reception unit 53b, and a state modification unit 53c based on instructions from the CPU 201 shown in FIG. 4.

The state setting unit 53a is configured to set the operating state of the terminal from OFFLINE to ONLINE in the terminal management state (see FIG. 10) based on the state information indicating turning on the power of the terminal instructed by the user who has switched ON the power switch 109 from OFF. The state setting unit 53a sets the operating state of the terminal from ONLINE to OFFLINE in the terminal management state (see FIG. 10) based on the state information indicating turning off the power of the terminal instructed by the user who has switched OFF the power switch 109 from ON.

The state reception unit 53b is configured to receive the state information of at least one of the request source terminal and the destination terminal from the terminal management table (see FIG. 10) when the state modification information transmitted from the request source terminal or the destination terminal is received by the transmitter/receiver unit 51.

The state modification unit 53c is configured to modify one of or both of the state information of the request source terminal and the state information of the destination terminal managed by the terminal management table (see FIG. 10) based on the modification request information received by the transmitter/receiver unit 51.

The terminal extraction unit 54 is configured to search the destination list management table (see FIG. 11) by the terminal ID of the request source terminal that has requested for the login as a key, and retrieve the terminal IDs of the destination candidate terminals capable of communicating with the request source terminal. As a result, the terminal extraction unit 54 extracts the terminal IDs of the destination candidate terminals capable of communicating with the request source terminal. Further, the terminal extraction unit 54 is configured to search the destination list management table (see FIG. 11) by the terminal ID of the request source terminal that has requested for the login as a key, and extract terminal IDs of other request source terminals that have registered the above terminal ID of the request source terminal as a destination candidate terminal.

The terminal state reception unit 55 is configured to search the terminal management table (see FIG. 10) by the terminal IDs of the destination candidate terminals extracted by the terminal extraction unit 54 as search keys, and retrieve the operating states of the extracted destination candidate terminals by the terminal IDs of the extracted destination candidate terminals. Thus, the terminal state reception unit 55 receives the operating states of the destination candidate terminals capable of communicating with the request source terminal that has requested the login. Further, the terminal state reception unit 55 is configured to search the terminal management table by the terminal IDs of the terminals extracted by the terminal extraction unit 54 as search keys and receive the operating state of the request source terminal that has requested the login.

Figure 19:
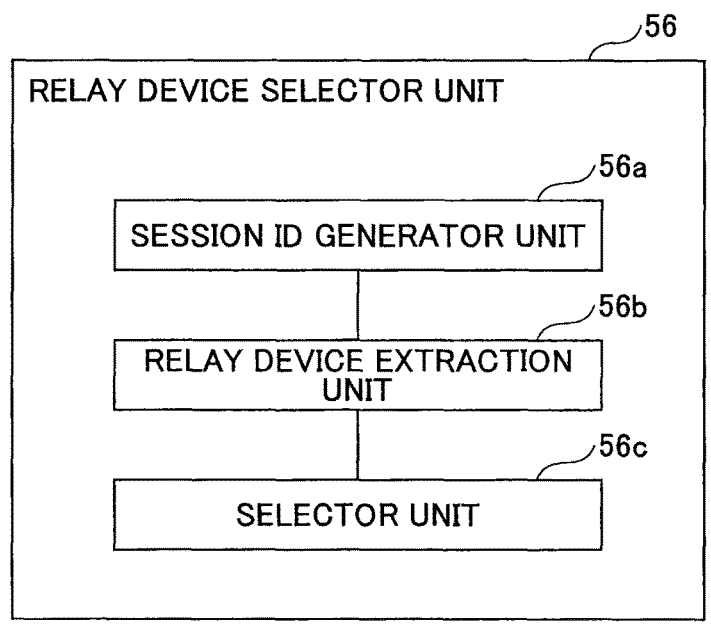
FIG. 19 is a block diagram showing a functional configuration of a relay device selector unit.

The relay device selector unit 56 is configured to perform a process of eventually selecting one of the relay devices 30. Thus, as shown in FIG. 19, the relay device selector unit 56 may implement a session ID generator unit 56a, a relay device extraction unit 56b, and a selector unit 56c based on instructions from the CPU 201 shown in FIG. 4.

The session ID generator unit 56a is configured to generate session IDs for identifying sessions in which the communication data are transmitted and received between the terminals. The relay device extraction unit 56b is configured to search the relay device assignment management table (see FIG. 14) based on the terminal ID of the request source terminal and the terminal ID of the destination terminal contained in the initiation request information transmitted from the request source terminal, and extract the relay device IDs corresponding to the request source terminal and the destination terminal. The selector unit 56c is configured to select the relay devices having the operating state "ONLINE" from the relay device management table (see FIG. 9).

The session management unit 57 is configured to store and manage the session IDs generated by the session ID generator unit 56a in association with the terminal ID of the request source terminal and the terminal ID of the destination terminal. Further, the session management unit 57 is configured to store and manage in the session management table the relay device ID of the finally selected one of the relay devices 30 in association with a corresponding one of session IDs.

The quality determination unit 58 is configured to search the quality control management table (see FIG. 13) by the delay time as a search key, extract the image quality of the corresponding image data, and determine the image quality of the image data relayed by the relay device 30. The store/read processing unit 59 is configured to store various data in the nonvolatile storage unit 5000 and retrieve various data from the nonvolatile storage unit 5000. The function of the store/read processing unit 59 may be implemented by the HDD 205 shown in FIG. 4. The delay time management unit 60 is configured to search the terminal management table (see FIG. 10) by the IP address of the destination terminal as a search key to extract the corresponding terminal ID. Further, the delay time management unit 60 is configured to store the delay time indicated by the delay information in a delay time field of the record corresponding to the extracted terminal ID in the session management table (see FIG. 12).

The determination unit 61 is configured to determine an appropriate process to modify the communication state between the terminals based on the modification request information received from the transmitter/receiver unit 51.

The assessment unit 62 is configured to determine whether the modification request information "REJECT" indicating the rejection of the initiation of the communication is received from all the terminals that have received the modification request information "INVITE" indicating a request for initiating the communication when the modification request information "REJECT" indicating the rejection of the initiation of the communication is received from any of the terminals that have received the modification request information "INVITE".

The modified request determination unit 63 is configured to determine whether the modification request information received by the transmitter/receiver unit 51 is specific modification request information. The specific modification request information not only indicates modification of the communication state of one of the request source terminal and the destination terminal, but also indicates modification of the communication states of both the request source terminal and the destination terminal. For example, the modification request information "INVITE" may not only modify the communication state of the request source terminal into "CALLING" but also modify the communication state of the destination terminal into "RINGING". Thus, the modified request determination unit 63 determines the modification request information "INVITE" as the specific modification request information. Likewise, the modified request determination unit 63 determines the modification request information "ACCEPT" indicating the authorization of the communication initiation, "REJECT" indication the rejection of the communication initiation, and "CANCEL" indicating the cancellation of the communication initiation as the specific modification request information in addition to the modification request information "INVITE".

The destination list management unit 65 is configured to add or delete the terminal IDs of the destination terminals for the terminal IDs of the request source terminals of the destination list management database 5004 (see FIG. 4).

Figure 20:
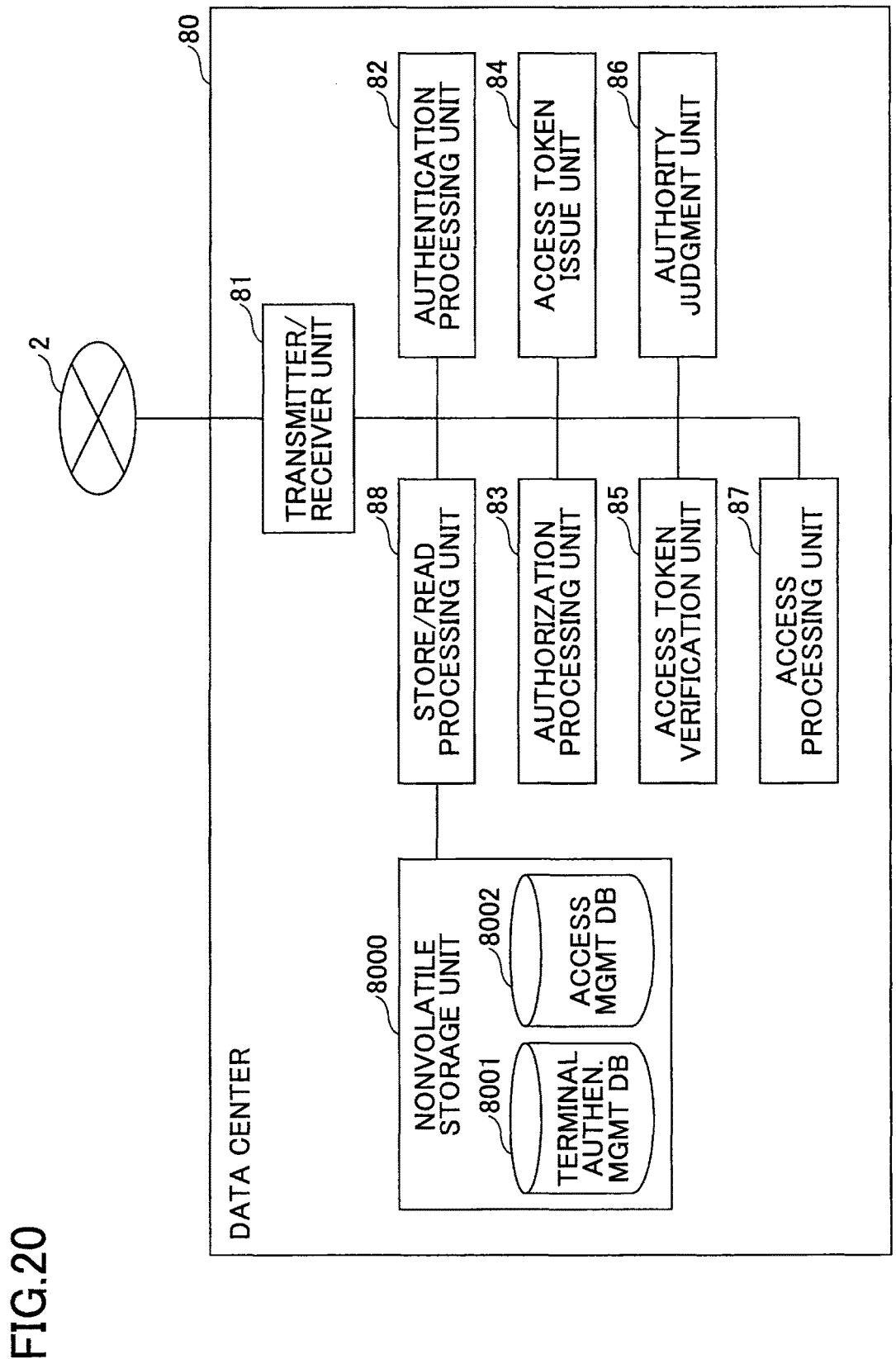
FIG. 20 is a block diagram showing a functional configuration of the data center which constitutes the transmission system according to the embodiment.

Next, FIG. 20 is a block diagram showing a functional configuration of the data center 80 which constitutes the transmission system 1 according to the embodiment. The transmission system 1 according to the embodiment corresponds to a communication system in the claims. The data center 80 in the transmission system 1 according to the embodiment corresponds to an information processing apparatus in the claims.

In FIG. 20, an authorization server among various servers included in the data center 80 is primarily illustrated. Note that other servers, such as an API server, and databases may be included in the data center 80 in addition to the authorization server.

As shown in FIG. 20, the data center 80 includes a transmitter/receiver unit 81, an authentication processing unit 82, an authorization processing unit 83, an access token issue unit 84, an access token verification unit 85, an authority judgment unit 86, an access processing unit 87, and a store/read processing unit 88. These units represent functions and units which are implemented by any of the elements and devices shown in FIG. 4, which are activated by instructions from the CPU 201 based on a data center program read from the HD 204 to the RAM 203.

Further, the data center 80 further includes a nonvolatile storage unit 8000 formed of the RAM 203 or the HD 204 shown in FIG. 4.

The nonvolatile storage unit 8000 includes a terminal authentication management DB 8001 formed of a terminal authentication management table shown in FIG. 21. In the terminal authentication management table, passwords are individually associated with the terminal IDs of all the terminals 10 managed by the data center 80. For example, in the terminal authentication management table shown in FIG. 21, the terminal ID "01aa" of the terminal 10aa is associated with the password "aaaa".

The nonvolatile storage unit 8000 further includes an access management DB 8002 formed of an access propriety judgment table shown in FIG. 22. In the access propriety judgment table, a combination of identification information (source_dc), such as a data center ID of a source data center having issued an access token for a protection resource accessing of which is managed by the data center 80, and identification information (destination_dc), such as a data center ID of a destination data center which is requested to access the protection resource therein, is associated with information indicating whether accessing of the protection resource is permitted or refused. For example, the access propriety judgment table shown in FIG. 22 indicates that, in a case where the data center ID of the source data center having issued the access token is "80ab" and the data center ID of the destination data center requested to access the protection resource is "80cd", the accessing of protection resources "roster" and "log" is refused ("false") and the accessing of a protection resource "user_profile" is permitted ("true"). Hence, it is possible to prevent accessing of the protection resources accessing of which is managed by the data center 80cd using another access token different from an access token issued by the data center 80cd. Namely, the protection resources accessing of which is managed by the data center 80cd may be isolated from the access management by the other data centers 80ab and 80ef different from the data center 80cd.

Next, a functional configuration of the data center 80 is described. Note that, in the following, the functions of the data center 80 are described in association with the main elements and devices for implementing the units of the data center 80 shown in FIG. 4.

The transmitter/receiver unit 81 of the data center 80 shown in FIG. 20 is configured to transmit various data (information) to and receive such data from other terminals, relay devices and systems via the communication network 2. The function of the transmitter/receiver unit 81 may be implemented by the network IF 209 shown in FIG. 4. The transmitter/receiver unit 81 receives login request information transmitted from the terminal 10 for requesting that the terminal 10 login the transmission system 1, and an authentication/authorization request for requesting authentication or authentication of the terminal 10.

The authentication processing unit 82 is configured to search the terminal authentication management table (see FIG. 21) of the nonvolatile storage unit 8000 using a terminal ID and password included in the login request information received by the transmitter/receiver unit 81 as a search key, and perform terminal authentication by determining whether the same terminal ID and password are managed in the terminal authentication management table.

The authorization processing unit 83 is configured to perform client authentication based on the authentication/authorization request received by the transmitter/receiver unit 81. Specifically, the authorization processing unit 83 extracts a parameter (response_type) that specifies an authorization process such as an authorization code flow, a client ID (client_id) that uniquely identifies a client who has transmitted the authentication/authorization request, and a parameter (scope) that specifies the protection resource accessing of which is requested, which are included in the authentication/authorization request. The authorization processing unit 83 performs the client authentication by determining whether the client has authority for accessing the protection resource using the specified authorization process.

The access token issue unit 84 is configured to issue an access token to the terminal of the client having transmitted the authentication/authorization request when the authorization processing unit 83 determines that the client has the authority to access the protection resource (i.e., when the result of the client authentication is a success). The access token is transmitted from the transmitter/receiver unit 81 to the terminal of the client. When the result of the client authentication is a first success, the access token issue unit 84 issues a refresh token to the terminal of the client having transmitted the authentication/authorization request. The refresh token is transmitted from the transmitter/receiver unit 81 to the terminal of the client.

The access token may include a user ID or client ID (client_id) that identifies the client to which the access token is issued, resource information (scope) that indicates the protection resource accessing of which is permitted, the term of validity (expire_at) of the access token, and a data center ID (dc_id) that identifies the data center 80 including the authorization server having issued the access token. A server ID that identifies the authorization server may be included in addition to the data center ID (dc_id) that identifies the data center 80 including the authorization server, or instead of the data center ID (dc_id) that identifies the data center 80 including the authorization server.

The access token verification unit 85 is configured to verify the validity of an access token or a refresh token by the access token or the refresh token included in an access request addressed to a protection resource (which will be simply called as an "access request") received by the transmitter/receiver unit 81. The access request includes a header and a data field other than the header, the header including an access token or a refresh token, and the data field including resource information indicating the protection resource to be accessed, and a uniform resource locator (URL) indicating a location of the protection resource in the communication network 2. For example, the access token verification unit 85 verifies an access token by decoding the access token using a common key which is provided in the data center 80. The common key may be provided beforehand in the data center 80. The access token verification unit 85 determines the access token as being valid when the access token can be decoded successfully using the common key, and determines the access token as being invalid when the decoding of the access token ends in failure.

The authority judgment unit 86 is configured to examine the authority of the access token or the refresh token when the access token or the refresh token is determined as being valid by the access token verification unit 85. The authority judgment unit 86 identifies the data center ID of the data center in which accessing the protection resource therein is requested based on the resource information indicating the protection resource to be accessed included in the access request. The authority judgment unit 86 searches the access propriety judgment table (see FIG. 22) of the nonvolatile storage unit 8000 using a data center ID (dc_id) identifying a source data center 80 having issued the access token, a data center ID (dc_id) identifying a destination data center in which accessing the protection resource therein is requested, and resource information (scope) indicating the protection resource to be accessed (these items are obtained by decoding the access token) as search keys. The authority judgment unit 86 determines that the access token (or the refresh token) has the authority to access the protection resource, when the accessing of the protection resource is permitted ("true") by the access propriety judgment table. The authority judgment unit 86 determines that the access token (or the refresh token) has no authority to access the protection resource, when the accessing of the protection resource is refused ("false") by the access propriety judgment table.

When the authority judgment unit 86 determines the access token (or the refresh token) as having the authority to access the protection resource, the access processing unit 87 is configured to generate a protection resource receiving request, and cause the transmitter/receiver unit 81 to transmit the protection resource receiving request. The access processing unit 87 performs an accessing process by giving permission to access the protection resource of the management system 50 by the terminal 10. The access processing unit 87 causes the transmitter/receiver unit 81 to transmit the protection resource to the terminal 10 having transmitted the access request.

When the authority judgment unit 86 determines the access token (or the refresh token) as having no authority to access the protection resource, the access processing unit 87 is configured to generate a message indicating that the terminal 10 is urged to receive an access token from an authorization server of the data center in which accessing of the protection resource therein is requested, and cause the transmitter/receiver unit 81 to transmit the message to the terminal 10.

The store/read processing unit 88 is configured to store various data in the nonvolatile storage unit 8000 and retrieve various data from the nonvolatile storage unit 8000. The function of the store/read processing unit 88 may be implemented by the HDD 205 shown in FIG. 4.

Figure 23:
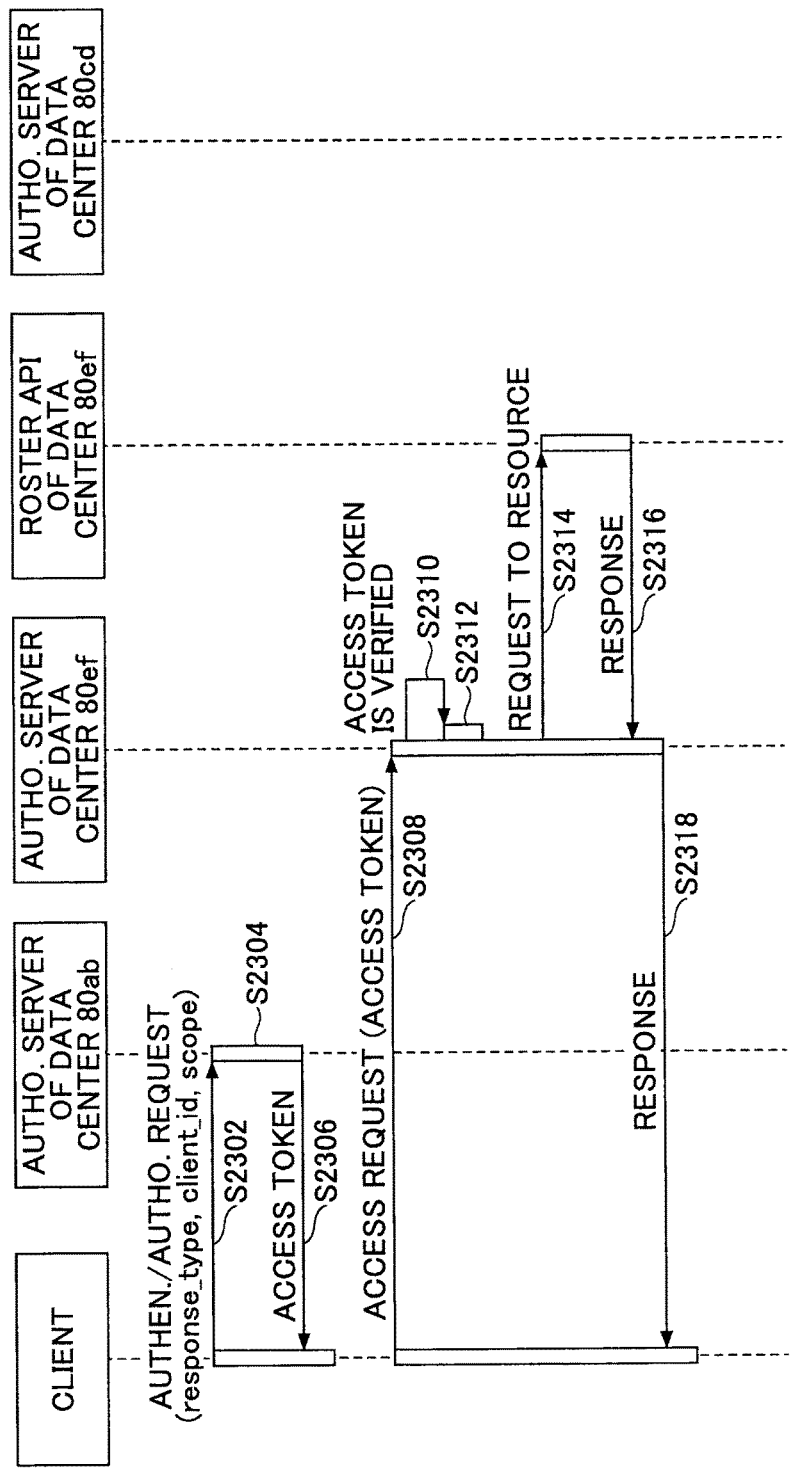
FIG. 23 is a sequence diagram for explaining operation of the transmission system according to the embodiment.
Figure 24:
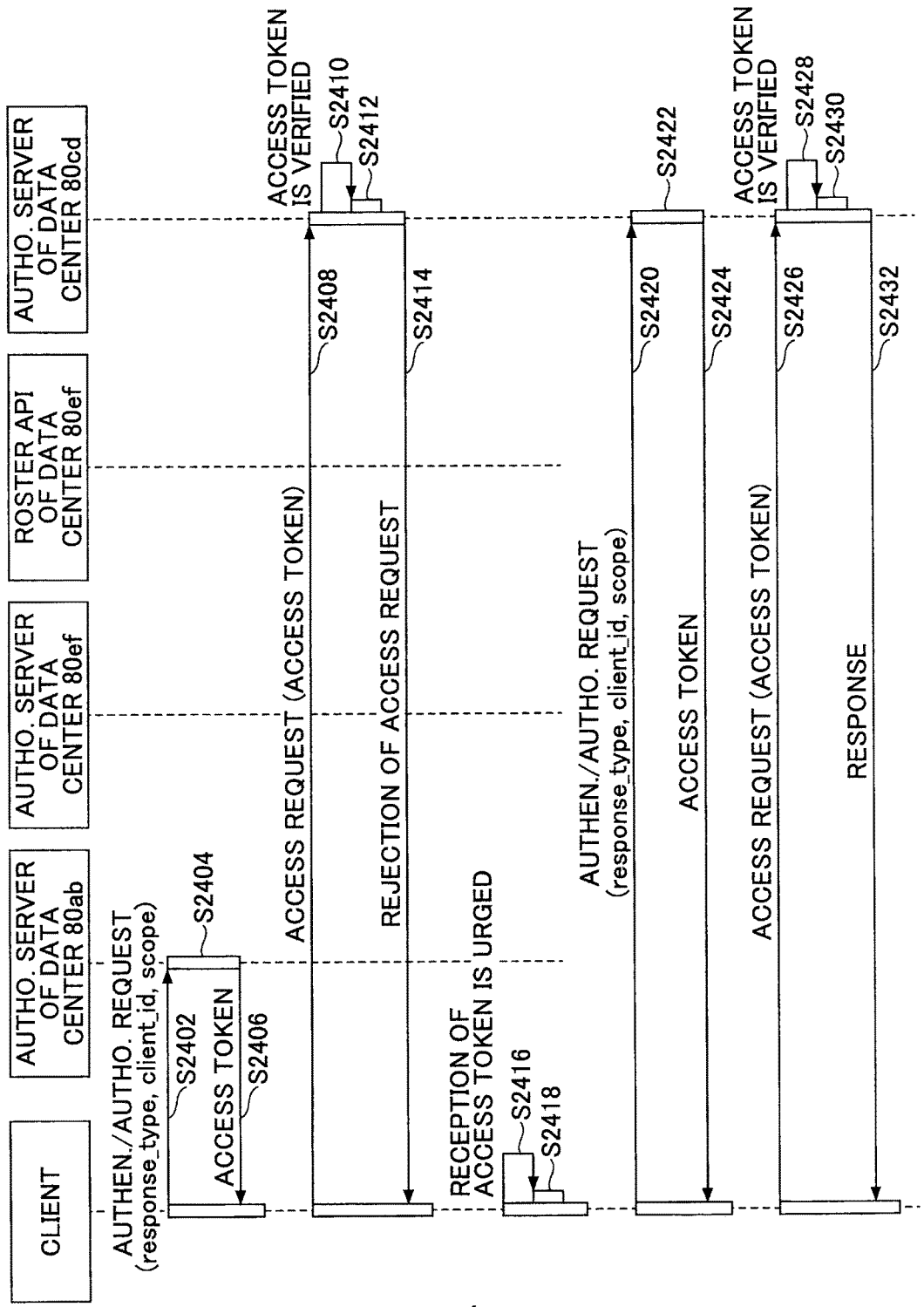
FIG. 24 is a sequence diagram for explaining operation of the transmission system according to the embodiment.
Figure 25:
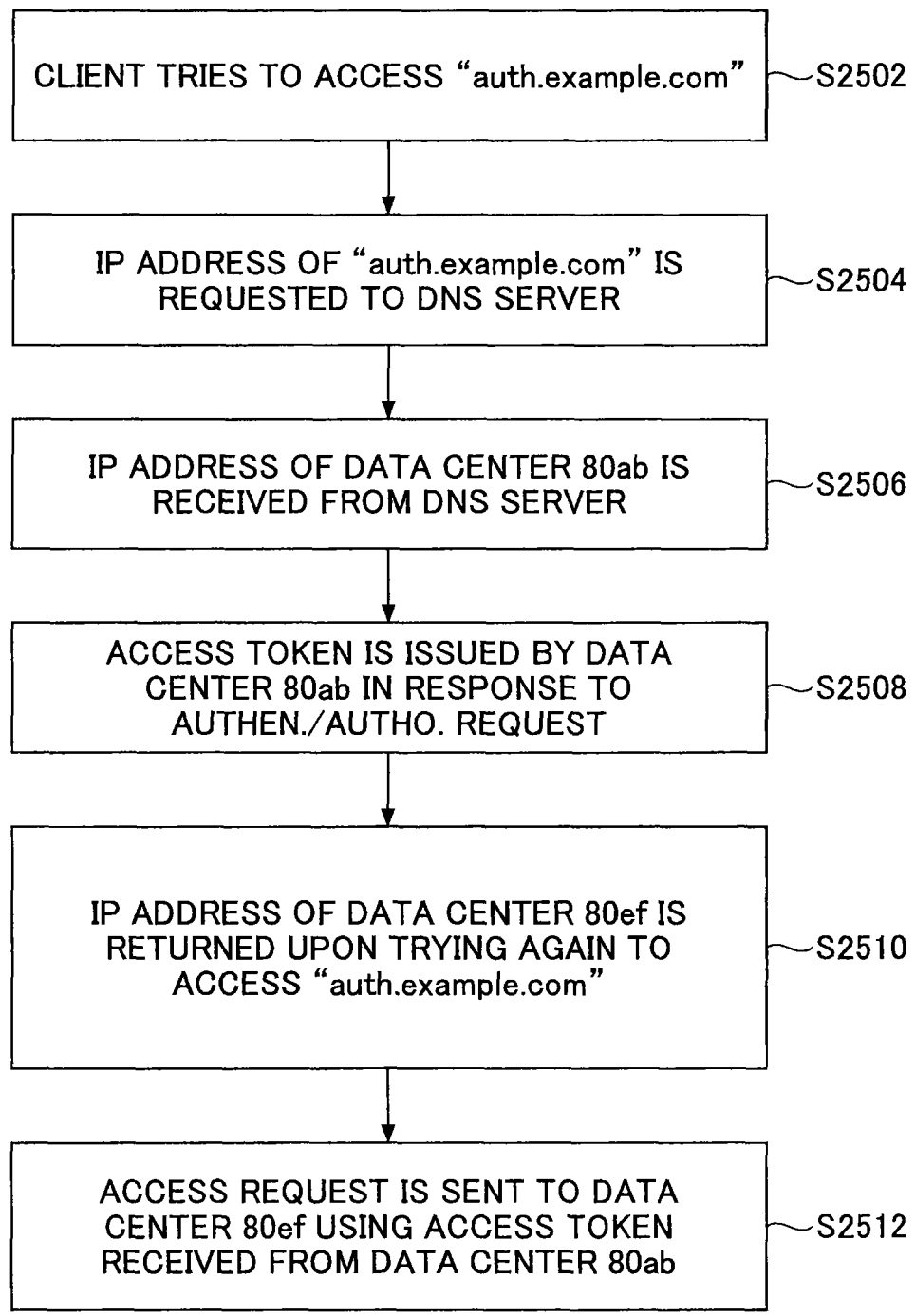
FIG. 25 is a flowchart for explaining operation of the transmission system according to the embodiment.
Figure 26:
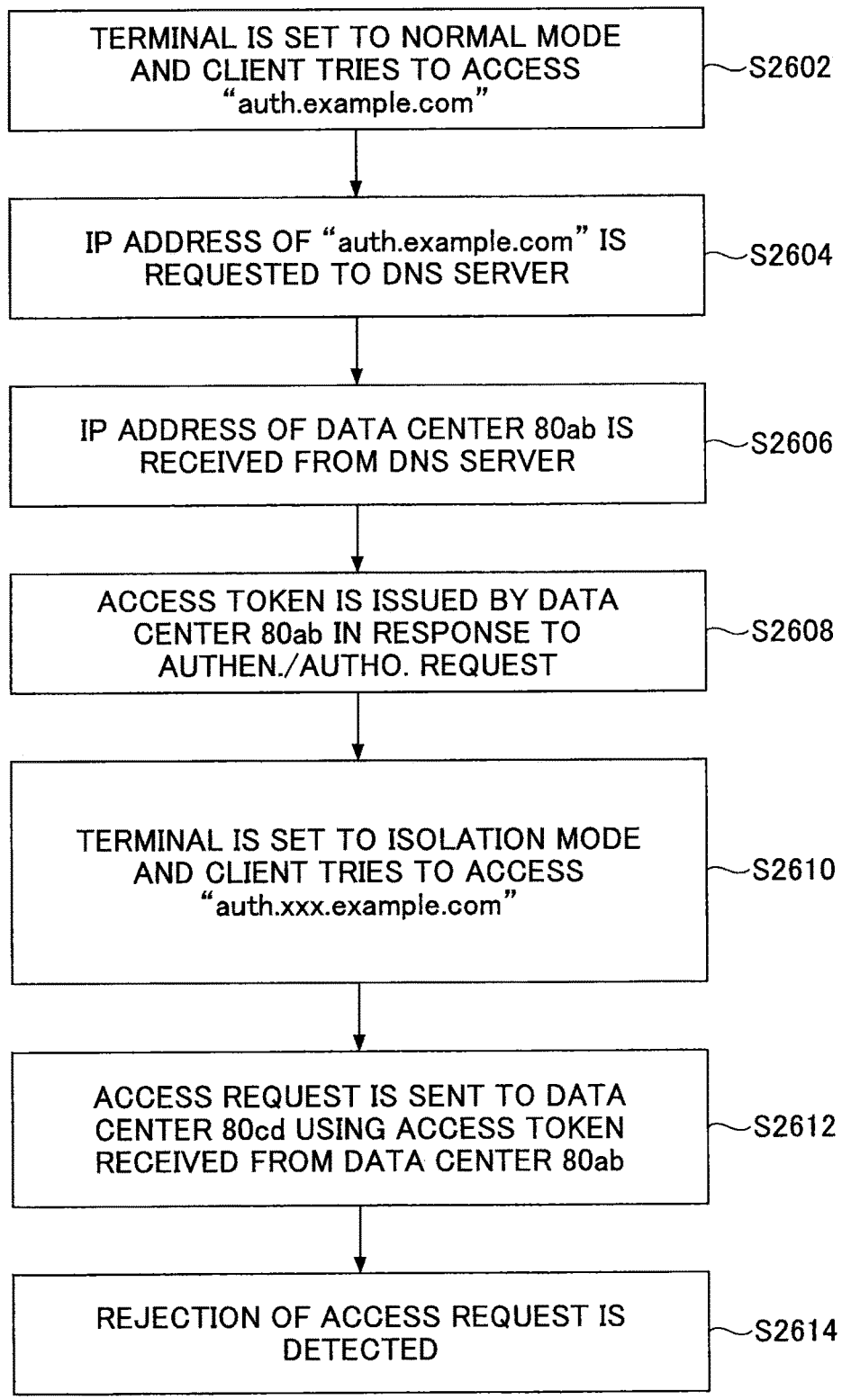
FIG. 26 is a flowchart for explaining operation of the transmission system according to the embodiment.

Next, operation of the transmission system 1 according to the embodiment is described with reference to FIGS. 23 to 26. FIG. 23 is a sequence diagram for explaining a process in which accessing a protection resource of a data center using an access token received from an authorization server of another data center is permitted. Namely, the process of FIG. 23 is performed when the data center 80*ef* is accessed using an access token issued by the data center 80*ab*, or when the data center 80*ab* is accessed using an access token issued by the data center 80*ef*. FIG. 24 is a sequence diagram for explaining a process in which accessing a protection resource of a data center using an access token received from an authorization server of another data center is refused. FIG. 25 is a flowchart for explaining a process for selecting the data center to be accessed. FIG. 26 is a flowchart for explaining another process for selecting the data center to be accessed.

In the process of FIG. 23, at the request of the terminal 10 in the area A of the transmission system 1, such as the terminal 10*aa* or the terminal 10*bc*, a protection resource (roster API) accessing of which is managed by the data center 80*ef* is accessed using an access token received from the data center 80*ab*. Note that the process of FIG. 23 is applicable also to a process in which a protection resource accessing of which is managed by the data center 80*ab* is accessed using an access token received from the data center 80*ef*.

If a client operates the operation button 108 of the terminal 10*aa* shown in FIG. 3, the operation input reception unit 12 shown in FIG. 5 receives an authentication/authorization request. When the authentication/authorization request is received by the operation input reception unit 12 as a trigger, the authentication/authorization request is transmitted from the transmitter/receiver unit 11 to the data center 80*ab* via the communication network (step S2302). The authentication/authorization request includes the parameter (response_type), the client ID (client_id), the parameter (scope), etc.

The authorization processing unit 83 of the data center 80*ab* performs client authentication based on the authentication/authorization request received by the transmitter/receiver unit 81 (step S2304).

When the authorization processing unit 83 of the data center 80*ab* determines that the client has the authority to access the protection resource, the access token issue unit 84 of the data center 80*ab* issues an access token to the terminal 10*aa* of the client having transmitted the authentication/authorization request. This access token is transmitted from the transmitter/receiver unit 81 to the terminal 10*aa* of the client (step S2306).

The access token includes the client ID (client_id) identifying the client to which the access token is issued, the resource information (scope) indicating the protection resource accessing of which is permitted, the term of validity (expire_at) of the access token, and the data center ID (dc_id) identifying the data center 80 including the authorization server having issued the access token (i.e., the ID of the data center 80*ab*).

If the client operates the operation button 108 of the terminal 10*aa* shown in FIG. 3, the operation input reception unit 12 shown in FIG. 5 receives an access request. When the access request is received by the operation input reception unit 12 as a trigger, the access request is transmitted from the transmitter/receiver unit 11 to the data center 80*ef* via the communication network 2 (step S2308). The header of the access request includes the access token, and the data field of the access request includes the resource information indicating the protection resource to be accessed and the location information (i.e., the URL) indicating the location of the protection resource in the communication network 2.

The access token verification unit 85 of the data center 80ef verifies the validity of the access token by decoding the access token using the common key provided in the data center 80ef (step S2310).

When the access token is determined as being valid by the access token verification unit 85, the authority judgment unit 86 of the data center 80ef examines the authority of the access token (step S2312). The authority judgment unit 86 identifies the data center ID of the data center in which accessing the protection resource therein is requested based on the resource information included in the access request and indicating the protection resource to be accessed. The authority judgment unit 86 searches the access propriety judgment table (see FIG. 22) of the nonvolatile storage unit 8000 using the data center ID (dc_id) identifying the source data center 80 having issued the access token, the resource information (scope) indicating the protection resource to be accessed, and the data center ID (dc_id) of the destination data center in which accessing the protection resource therein is requested (these items are obtained by decoding the access token) as search keys. The authority judgment unit 86 determines whether the access token has the authority to access the protection resource, depending on whether the accessing of the protection resource is permitted or refused by the access propriety judgment table.

The access processing unit 87 of the data center 80ef generates a protection resource receiving request, when the authority judgment unit 86 determines the access token as having the authority to access the protection resource, and causes the transmitter/receiver unit 81 to transmit the protection resource receiving request to the management system 50ef (step S2314).

If the protection resource (roster API) is received from the management system 50ef as a response to the protection resource receiving request (step S2316), the access processing unit 87 of the data center 80ef causes the transmitter/receiver unit 81 to transmit the response including the protection resource to the terminal 10 having transmitted the access request (step S2318). The response includes address book data indicating the number of cases, user IDs, and titles, as the protection resource.

In the process of FIG. 24, at the request of the terminal 10 in the area A of the transmission system 1, such as the terminal 10aa or the terminal 10bc, a protection resource accessing of which is managed by the data center 80cd is accessed using an access token received from the data center 80ab. Note that the process of FIG. 24 is applicable also to a process in which at the request of the terminal 10 in the area C of the transmission system 1, such as the terminal 10ea or the terminal 10fa, a protection resource accessing of which is managed by the data center 80cd is accessed using an access token received from the data center 80ef.

If a client operates the operation button 108 of the terminal 10aa shown in FIG. 3, the operation input reception unit 12 shown in FIG. 5 receives an authentication/authorization request. When the authentication/authorization request is received by the operation input reception unit 12 as a trigger, the authentication/authorization request is transmitted from the transmitter/receiver unit 11 to the data center 80ab via the communication network 2 (step S2402). The authentication/authorization request includes the parameter (response_type), the client ID (client_id), and the parameter (scope).

The authorization processing unit 83 of the data center 80ab performs client authentication based on the authentication/authorization request received by the transmitter/receiver unit 81 (step S2404).

When the authorization processing unit 83 of the data center 80ab determines that the client has the authority to access the protection resource, the access token issue unit 84 of the data center 80ab issues an access token to the terminal 10aa of the client having transmitted the authentication/authorization request. This access token is transmitted from the transmitter/receiver unit 81 to the terminal 10aa of the client (step S2406).

The access token includes the client ID (client_id) identifying the client to which the access token is issued, the resource information (scope) indicating the protection resource accessing of which is permitted, the term of validity (expire_at) of the access token, and the data center ID (dc_id) identifying the data center 80 including the authorization server having issued the access token.

If the client operates the operation button 108 of the terminal 10aa shown in FIG. 3, the operation input reception unit 12 shown in FIG. 5 receives an access request. When the access request is received by the operation input reception unit 12 as a trigger, the access request is transmitted from the transmitter/receiver unit 11 to the data center 80cd via the communication network 2 (step S2408). The header of the access request includes the access token, and the date field of the access request includes the resource information indicating the protection resource to be accessed and the location information indicating the location of the protection resource in the communication network 2.

The access token verification unit 85 of the data center 80cd verifies the validity of the access token by decoding the access token using the common key provided in the data center 80cd (step S2410).

When the access token is determined as being valid by the access token verification unit 85, the authority judgment unit 86 of the data center 80cd examines the authority of the access token (step S2412). The authority judgment unit 86 identifies the data center ID of the data center in which accessing of the protection resource therein is requested based on the resource information indicating the protection resource to be accessed included in the access request. The authority judgment unit 86 searches the access propriety judgment table (see FIG. 22) of the nonvolatile storage unit 8000 using the data center ID (dc_id) identifying the source data center 80 having issued the access token, the resource information (scope) indicating the protection resource to be accessed, and the data center ID (dc_id) identifying the destination data center in which accessing the protection resource is requested (these items are obtained by decoding the access token) as search keys. The authority judgment unit 86 determines whether the access token has the authority to access the protection resource, depending on whether the accessing of the protection resource is permitted or refused by the access propriety judgment table.

When the authority judgment unit 86 determines the access token as having no authority to access the protection resource, the access processing unit 87 of the data center 80cd causes the transmitter/receiver unit 81 to transmit a message indicating that the access request is refused and the terminal is urged to receive another access token from an authorization server of the data center in which accessing of the protection resource therein is requested, to the terminal 10aa having transmitted the access request (step S2414).

When the message indicating that the access request is refused by the data center 80cd is received at the terminal 10aa, the display control unit 16 displays on the display 120 a message indicating that the access request is refused (step S2416). Further, the display control unit 16 displays on the display 120 a message indicating that the terminal 10aa is urged to receive another access token (step S2418).

If the client operates the operation button 108 of the terminal 10aa shown in FIG. 3, the operation input reception unit 12 shown in FIG. 5 receives an authentication/authorization request. When the authentication/authorization request is received by the operation input reception unit as a trigger, the authentication/authorization request is transmitted from the transmitter/receiver unit 11 to the data center 80cd via the communication network 2 (step S2420). The authentication/authorization request includes the parameter (response_type), the client ID (client_id), and the parameter (scope). Note that, prior to the transmission of the authentication/authorization request, the call control between the terminal 10aa and the management system 50cd is carried out so that a session is established between the terminal 10aa and the management system 50cd.

The authorization processing unit 83 of the data center 80cd performs client authentication based on the authentication/authorization request received by the transmitter/receiver unit 81 (step S2422).

When the authorization processing unit 83 of the data center 80cd determines that the client has the authority to access the protection resource, the access token issue unit 84 of the data center 80cd issues an access token to the terminal 10aa of the client having transmitted the authentication/authorization request. This access token is transmitted from the transmitter/receiver unit 81 to the terminal 10aa of the client (step S2424).

The access token includes the client ID (client_id) identifying the client to which the access token is issued, the resource information (scope) indicating the protection resource accessing of which is permitted, the term of validity (expire_at) of the access token, and the data center ID (dc_id) identifying the data center 80 including the authorization server having issued the access token.

If the client operates the operation button 108 of the terminal 10aa shown in FIG. 3, the operation input reception unit 12 shown in FIG. 5 receives an access request. When the access request is received by the operation input reception unit 12 as a trigger, the access request is transmitted from the transmitter/receiver unit 11 to the data center 80cd via the communication network 2 (step S2426). The header of the access request includes the access token, and the data field of the access request includes the resource information indicating the protection resource to be accessed and the location information (i.e., the URL) indicating the location of the protection resource in the communication network 2.

The access token verification unit 85 of the data center 80cd verifies the validity of the access token by decoding the access token using the common key provided in the data center 80cd (step S2428).

When the access token is determined as being valid by the access token verification unit 85, the authority judgment unit 86 of the data center 80cd examines the authority of the access token (step S2430). The authority judgment unit 86 identifies the data center ID of the data center in which accessing of the protection resource therein is requested, based on the resource information indicating the protection resource to be accessed included in the access request. The authority judgment unit 86 searches the access propriety judgment table (see FIG. 22) of the nonvolatile storage unit 8000 using the data center ID (dc_id) identifying the source data center 80 having issued the access token, the resource information (scope) indicating the protection resource to be accessed, and the data center ID (dc_id) identifying the destination data center in which accessing of the protection resource therein is requested (these items are obtained by decoding the access token) as search keys. The authority judgment unit 86 determines whether the access token has the authority to access the protection resource, depending on whether the accessing of the protection resource is permitted or refused by the access propriety judgment table. In this case, the data center in which accessing of the protection resource is requested is the same as the data center having issued the access token, and it is determined that the access token has the authority to access the protection resource.

When the authority judgment unit 86 of the data center 80cd determines the access token as having the authority to access the protection resource, the access processing unit 87 of the data center 80cd causes the transmitter/receiver unit 81 to receive the protection resource from the management system 50cd as a response to the access request, and to transmit the response including the protection resource to the terminal 10aa having transmitted the access request (step S2432). The response includes address book data indicating the number of cases, user IDs, and titles as the protection resource.

In the process of FIG. 25, the terminal 10 selects the data center to be accessed in the transmission system 1 at the time of accessing the protection resource. This process is performed when the terminal 10 selects the data center to which an access request is transmitted at the step S2308 in the process of FIG. 23 and at the step S2408 in the process of FIG. 24.

At the beginning of the process of FIG. 25, the client tries to access a protection resource "auth.example.com" (step S2502).

To access the protection resource "auth.example.com", the client operates the operation button 108 of the terminal 10aa shown in FIG. 3, and the operation input reception unit 12 shown in FIG. 5 receives an authentication/authorization request. When the authentication/authorization request is received by the operation input reception unit 12 as a trigger, the authentication/authorization request is transmitted from the transmitter/receiver unit 11 to the data center 80ab via the communication network 2. The authentication/authorization request includes the parameter (response_type), the client ID (client_id), and the parameter (scope). In this case, the parameter (scope) of the authentication/authorization request is set to "auth.example.com". To obtain an IP address of the protection resource "auth.example.com" before transmitting the authentication/authorization request, the transmitter/receiver unit 11 accesses a DNS (domain name system) server via the communication network 2 to request the IP address of the protection resource "auth.example.com" (step S2504).

The transmitter/receiver unit 11 of the terminal 10aa receives the IP address of the data center 80ab from the DNS server (step S2506).

The terminal 10aa transmits the authentication/authorization request to the data center 80ab, and in response to the request, the data center 80ab issues an access token to the terminal 10aa (step S2508).

Here, it is assumed that after the terminal 10aa receives the access token from the data center 80ab, an event in which the client moves to the area C where the data center 80ef is located, or an event in which the data center 80ab goes down takes place.

If the client operates again the operation button 108 of the terminal 10aa shown in FIG. 3 due to the event, the operation input reception unit 12 shown in FIG. 5 receives an access request. When the access request is received by the operation input reception unit 12 as a trigger, the access request is transmitted from the transmitter/receiver unit 11 to the data center 80ab via the communication network 2. At the time of transmitting the access request, the transmitter/receiver unit 11 accesses the DNS server via the communication network 2 and requests the IP address of the protection resource "aauth.example.com". Hence, the transmitter/receiver unit 11 of the terminal 10aa receives the IP address of the data center 80ef from the DNS server (step S2510).

The transmitter/receiver unit 11 of the terminal 10aa transmits the access request to the data center 80ef via the communication network 2 (step S2512). The header of this access request includes the access token received at step S2508, and the data field of the access request includes the resource information (i.e., "auth.example.com") indicating the protection resource to be accessed and the location information (i.e., the URL) indicating the location of the protection resource in the communication network 2. Hence, even if the terminal 10 moves out of the area managed by the data center 80 having issued the access token after the access token is received, the access request can be automatically transmitted to the new data center 80 to manage the area where the terminal 10 is located without the need for the client to be conscious of the IP address of the new data center 80.

In the process of FIG. 26, the terminal 10 in the transmission system 1 selects the data center to be accessed by switching an operational mode of the terminal 10 at the time of accessing the protection resource. Here, it is assumed that the operational mode of the terminal 10 may be set to one of a normal mode and an isolation mode.

The normal mode is used to access the protection resource accessing of which is managed by the data center 80ab or the data center 80ed. Namely, the normal mode is used to access the protection resource accessing of which is managed by the data center which is not isolated from other data centers. In this case, to access the protection resource, the location information (i.e., the URL) indicating the location of the protection resource in the communication network 2 is set up beforehand in the terminal 10.

The isolation mode is used to access the protection resource accessing of which is managed by the data center 80cd. Namely, the isolation mode is used to access the protection resource accessing of which is managed by the data center 80cd which is isolated from other data centers. In this case, to access the protection resource, the location information (i.e., the URL) indicating the location of the initially accessed protection resource in the communication network 2 is stored beforehand in the terminal 10. The process of FIG. 26 is performed when the access request including the access token is refused at the steps S2412-S2414 in the process of FIG. 24.

At the beginning of the process of FIG. 26, the terminal 10aa is set to the normal mode and the client tries to access the protection resource "auth.example.com" (step S2602).

To access the protection resource "auth.example.com", the client operates the operation button 108 of the terminal 10aa shown in FIG. 3, and the operation input reception unit 12 shown in FIG. 5 receives an authentication/authorization request. When the authentication/authorization request is received by the operation input reception unit 12 as a trigger, the authentication/authorization request is transmitted from the transmitter/receiver unit 11 to the data center 80ab via the communication network 2. The authentication/authorization request includes the parameter (response_type), the client ID (client_id), and the parameter (scope). In this case, the parameter (scope) of the authentication/authorization request is set to "auth.example.com". To obtain an IP address of the protection resource "auth.example.com" before transmitting the authentication/authorization request, the transmitter/receiver unit 11 accesses the DNS server via the communication network 2 to request the IP address of the protection resource "auth.example.com" (step S2604).

The transmitter/receiver unit 11 of the terminal 10aa receives the IP address of the data center 80ab from the DNS server (step S2606).

The terminal 10aa transmits the authentication/authorization request to the data center 80ab, and in response to the request, the data center 80ab issues an access token to the terminal 10aa (step S2608).

The client sets the operational mode of the terminal 10aa to the isolation mode and tries to access the protection resource "auth.xxx.example.com" (step S2610). For example, by viewing a display indication on the display 120 indicating that the client is urged to set the isolation mode of the terminal, the client sets the operational mode of the terminal 10aa to the isolation mode.

To access the protection resource "auth.xxx.example.com" in the area B, the client operates the operation button 108 of the terminal 10aa shown in FIG. 3, and the operation input reception unit 12 shown in FIG. 5 receives an access request. When the access request is received by the operation input reception unit 12 as a trigger, the access request is transmitted from the transmitter/receiver unit 11 to the data center 80cd via the communication network 2. The header of the access request includes the access token received at step S2608, and the data field of the access request includes the resource information indicating the protection resource to be accessed, and the location information (i.e., the URL) indicating the location of the protection resource in the communication network 2 (step S2612).

The authority judgment unit 86 of the data center 80cd searches the access propriety judgment table (see FIG. 22) of the nonvolatile storage unit 8000 using the data center ID (dc_id) identifying the source data center 80 having issued the access token, the resource information (scope) indicating the protection resource to be accessed, and the data center ID (dc_id) identifying the destination data center in which accessing the protection resource is requested (these items are obtained by decoding the access token) as search keys. Then, the authority judgment unit 86 determines that the access request is refused (step S2614).

Accordingly, when the protection resource in the isolated data center is accessed, an access request including an access token issued by another data center different from the data center managing the protection resource may be refused.

According to the above-described embodiment, the protection resource accessing of which is managed by the data center may be isolated from the access management by other data centers different from the data center. Namely, it is possible to prevent accessing of the protection resource which is managed by the data center, using an access token issued by another data center different from an access token issued by the data center.

When the terminal accesses the protection resource accessing of which is managed by the data center, using the access token issued by another data center, the data center is capable of refusing the access request from the terminal. The data center is capable of requesting the terminal to receive an access token from the data center. The terminal performs call control between the terminal and the management system in the area where the data center is located, and receives an access token from the data center. The management system in the same area performs call control between the management system and the terminal. The terminal is connected to the management system and to the protection resource, and leakage of the protection resource may be prevented.

Even when the same system program is executed by each of a plurality of data centers, it is possible to prevent accessing of the protection resource which is managed by one of the data centers. A method of isolating a specific data center may include a method of using different domains and a method of using different signatures of access tokens. The access management is performed using an access token including a data center ID, and the applications which are deployed in the data center may be shared and the access may be controlled only by modifying the setting. Further, not only a simple access management to select permission or refusal but also a detailed access management on a resource by resource basis, for example, accessing a user's profile is permitted but accessing an address book is inhibited, may be performed.

In the above-described embodiment, the destination list frame 1100-1 including the destination names 1100-2, the icons 1100-3$a$ and the like is displayed as shown in FIG. 6. However, the destination names 1100-2, the icons 1100-3$a$ and the like may be displayed without displaying the destination list frame 1100-1.

In the above-described embodiment, the data center 80 is an example of the information processing apparatus.

In the above-described embodiment, the data center 80 and the management system 50 are separately arranged. However, the data center 80 may be arranged to include the management system 50 and the data center 80 and the management system 50 may be integrated in a single information processing apparatus. That is, the functions and units of the data center 80 and the management system 50 may be integrated in the same information processing apparatus.

Moreover, according to the above-described embodiment, recording media storing the data center program, the terminal program, the relay device program, the authorization server program and the management system program, the HD 204 storing these programs, and a program providing system including the HD 204 may be distributed to users domestically and abroad as a program product.

Further, according to the above-described embodiment, the image data relayed by the relay device 30 are managed based mainly focused on the resolutions of the images as an example of quality of the images by utilizing the modified quality management table and the quality control management table. However, the quality of the images is not limited to this example. The quality of images may be managed based on the depth of the image data, the sampling frequency of the voice data, or the bit length of the voice data.

In addition, in the above-described embodiment, the reception date and times are managed by the relay device management table, the terminal management table and the session management table. However, alternatively, at least the reception times may be managed by the relay device management table, the terminal management table and the session management table.

Moreover, in the above-described embodiment, the IP addresses of the relay devices are managed by the relay device management table, and the IP addresses of the terminals are managed by the terminal management table. However, alternatively, respective fully qualified domain names (FQDNs) of the relay devices 30 and the terminals 10 may be managed instead of the respective IP addresses as relay device specifying information for specifying the relay devices 30 over the communication network 2 and terminal specifying information for specifying the terminals 10 over the communication network 2. In this case, a known DNS (domain name system) server may acquire the IP address corresponding to the FQDN. Note that the "relay device specifying information for specifying the relay devices 30 over the communication network 2" may also be expressed as "relay device access point information indicating access points of the relay devices 30 over the communication network 2" or "relay device destination information indicating destinations of the relay devices 30 over the communication network 2". Likewise, the "terminal specifying information for specifying the terminals 10 over the communication network 2" may also be expressed as "terminal access point information indicating access points of the terminals 10 over the communication network 2" or "terminal destination information indicating destinations of the terminals 10 over the communication network 2".

In the above-described embodiment, the terms "videoconference" and "teleconference" may be interchangeably used, and the terms "transmission system" and "communication system" may be interchangeably used.

Further, in the above-described embodiment, the videoconference system is described as an example of the transmission system 1. However, the transmission system 1 may not be limited to the videoconference system. The transmission system 1 may be a telephone system, such as an Internet protocol (IP) phone or an Internet phone. Further, the transmission system 1 may be a car navigation system. In this case, one of the terminals 10 may be a car navigation device mounted on a vehicle and the other terminal 10 may be a management terminal or a management server configured to manage the car navigation, or another car navigation device mounted on another vehicle. Furthermore, the transmission system 1 may be an audio conferencing system or a personal computer (PC) screen shared system.

Further, the transmission systems 1 may be a mobile phone communication system. In this case, the terminal 10 may be a mobile phone terminal. Specifically, the mobile phone terminal as the terminal 10 may include a main body, a menu screen display button arranged on the main body, a display unit mounted on the main body, a microphone provided in a lower part of the main body, and a speaker provided in a surface of the main body. Among these, the "menu screen display button" may be a button utilized for displaying a menu screen on which icons of various applications are displayed. The display unit may be formed of a touch panel on which the user touches with a finger or hand to select a desired destination name to communicate with a person of the desired destination terminal.

Further, in the above-described embodiment, the image data and the voice data are described as an example of the content data. However, the content data may not be limited to the image data or the voice data. The content data may be touch data (tactile data). In this case, a tactile sense obtained by the user who has touched one terminal may be transmitted to the other terminal. Further, the content data may be smell data (olfactory data). In this case, the smell (odor) obtained by the user on one terminal may be transmitted to the other terminal. Further, the content data may be at least one of the image data, the voice data, the touch data, and the smell data.

Further, in the above-described embodiment, the videoconference system implemented by the transmission system 1 is described. However, the transmission system 1 may not be limited to the videoconference system. The transmission system 1 may be utilized for a preliminary meeting, a casual conversation between family members or friends, or one-way presentation of information.

As described in the foregoing, according to the invention, the leakage of the protection resource accessing of which is managed by another information processing apparatus can be prevented.

The information processing apparatus, the access control method and the communication system according to the invention are not limited to the above-described embodiments, and variations and modifications may be made without departing from the scope of the invention.

The information processing apparatus according to the invention may be implemented in any convenient form, for example, using dedicated hardware, or a mixture of dedicated hardware and software. The communication system according to the invention may be implemented as computer software implemented by one or more networked processing apparatuses. The network may comprise any conventional terrestrial or wireless communication network, such as the Internet. The processing apparatuses may comprise any suitably programmed apparatuses such as a general-purpose computer, a personal digital assistant, a mobile telephone (such as a WAP or 3G-compliant phone) and so on. Since the transmission system and terminal according to the present invention may be implemented as software, each and each aspect of the present invention thus encompasses computer software implementable on a programmable device.

The computer software may be provided to the programmable device using any storage medium for storing processor readable code such as a floppy disk, a hard disk, a CD ROM, a magnetic tape device or a solid state memory device.

The hardware platform includes any desired kind of hardware resources including, for example, a central processing unit (CPU), a random access memory (RAM), and a hard disk drive (HDD). The CPU may be implemented by any desired kind of any desired number of processors. The RAM may be implemented by any desired kind of volatile or non-volatile memory. The HDD may be implemented by any desired kind of non-volatile memory capable of storing a large amount of data. The hardware resources may additionally include an input device, an output device, and a network device depending on the type of the apparatus. Alternatively, the HDD may be provided external to the apparatus as long as the HDD is accessible from the apparatus. In this example, the CPU, such as a cache memory of the CPU, and the RAM may operate as a physical memory or a primary memory of the apparatus, while the HDD may operate as a secondary memory of the apparatus.

The present application is based upon and claims the benefit of priority of Japanese Patent Application No. 2014-180948, filed on Sep. 5, 2014, the contents of which are incorporated herein by reference in their entirety.

What is claimed is:

1. An information processing apparatus, comprising:
a receiver configured to receive, from a terminal, an access request addressed to a resource, access to which is managed; and
processing circuitry configured to
determine whether to grant the access request to access the resource, based on an access token included in the access request and used to access the resource, and
permit the accessing of the resource when determining to grant the access request to access the resource,
wherein the processing circuitry is further configured to
determine whether to grant the access request to access the resource based on first information identifying a source apparatus having issued the access token, the first information being included in the access token.

2. The information processing apparatus according to claim 1, wherein the processing circuitry is further configured to
determine not to grant the access request to access the resource when the first information identifying the source apparatus having issued the access token and being included in the access token differs from second information identifying a destination apparatus in which the access to the resource is requested by the access request, and
determine to rant the access request to access the resource when the first information identifying the source apparatus is the same as the second information identifying the destination apparatus.

3. The information processing apparatus according to claim 1, further comprising:
an access management memory including a table in which a combination of identification information identifying a source apparatus having issued an access token to the terminal and identification information identifying a destination apparatus being requested to allow access to a resource therein is associated with information indicating whether the accessing of the resource is permitted or refused, for each of a plurality of resources,
wherein the processing circuitry is further configured to determine whether to grant the access request to access the resource based on the first information identifying the source apparatus having issued the access token and second information identifying a destination apparatus in which accessing of the resource is requested by the access request, both the first information and the second information being included in the access token.

4. The information processing apparatus according to claim 1, wherein, when the processing circuitry determines not to grant the access request to access the resource, the processing circuitry is configured to generate a message indicating that the terminal should receive an access token for accessing the resource from a server that manages accessing of the resource requested by the access request.

5. The information processing apparatus according to claim 1, wherein the processing circuitry is further configured to:
determine whether a client of the terminal has authority to access the resource based on an authentication/authorization request received from the terminal;
issue the access token to the terminal having transmitted the authentication/authorization request when the processing circuitry determines the client as having the authority to access the resource; and
transmit the access token to the terminal,
wherein the processing circuitry issues the access token, which includes the first identification information identifying the source apparatus having issued the access token.

6. An access control method performed by an information processing apparatus to control accessing of a resource based on an access request transmitted from a terminal, the method comprising:
receiving, from the terminal, the access request addressed to the resource, access to which is managed;
determining whether to grant the access request to access the resource, based on an access token included in the access request and used to access the resource; and
permitting the accessing of the resource when determining to grant the access request to access the resource, wherein the determining step includes determining whether to grant the access request to access the resource based on first information identifying a source apparatus having issued the access token, the first information being included in the access token.

7. The access control method according to claim 6, wherein the determining step includes:
    determining not to grant the access request to access the resource when the first information identifying the source apparatus having issued the access token and being included in the access token differs from second information identifying a destination apparatus in which the access to the resource is requested by the access request; and
    determining to grant the access request to access the resource when the first information identifying the source apparatus is the same as the second information identifying the destination apparatus.

8. The access control method according to claim 6, wherein the information processing apparatus includes an access management memory including a table in which a combination of identification information identifying a source apparatus having issued an access token to the terminal and identification information identifying a destination apparatus being requested to access a resource therein is associated with information indicating whether the accessing of the resource is permitted or refused, for each of a plurality of resources, and
    wherein the determining step includes determining whether to grant the access request to access the resource based on the first information identifying the source apparatus having issued the access token and second information identifying a destination apparatus in which accessing of the resource is requested by the access request, both the first information and the second information being included in the access token.

9. The access control method according to claim 6, further comprising:
    when determining not to grant the access request to access the resource, generating a message indicating that the terminal should receive an access token for accessing the resource from a server that manages accessing of the resource requested by the access request.

10. A communication system, comprising:
    a terminal; and
    an information processing apparatus including:
    a receiver configured to receive, from the terminal, an access request addressed to a resource, access to which is managed; and
    processing circuitry configured to
        determine whether to grant the access request to access the resource based on an access token included in the access request and used to access the resource, and permit the accessing of the resource when determining to grant the access request to access the resource,
    wherein the processing circuitry is configured to determine whether to grant the access request to access the resource based on first information identifying a source apparatus having issued the access token, the first information being included in the access token.

11. The communication system according to claim 10, wherein the processing circuitry is further configured to
    determine not to grant the access request to access the resource when the first information identifying the source apparatus having issued the access token and being included in the access token differs from second information identifying a destination apparatus in which the access to the resource is requested by the access request, and
    determine to grant the access request to access the resource when the first information identifying the source apparatus is the same as the second information identifying the destination apparatus.

12. The communication system according to claim 10, further comprising:
    an access management memory including a table in which a combination of identification information identifying a source apparatus having issued an access token to the terminal and identification information identifying a destination apparatus being requested to allow access to a resource therein is associated with information indicating whether the accessing of the resource is permitted or refused, for each of a plurality of resources,
    wherein the processing circuitry is further configured to determine whether to grant the access request to access the resource based on the first information identifying the source apparatus having issued the access token and second information identifying a destination apparatus in which accessing of the resource is requested by the access request, both the first information and the second information being included in the access token.

13. The communication system according to claim 10, wherein, when the processing circuitry determines not to grant the access request to access the resource, the processing circuitry is configured to generate a message indicating that the terminal should receive an access token for accessing the resource from a server that manages accessing of the resource requested by the access request.

14. The communication system according to claim 10, wherein the processing circuitry is further configured to:
    determine whether a client of the terminal has authority to access the resource based on an authentication/authorization request received from the terminal;
    issue the access token to the terminal having transmitted the authentication/authorization request when the processing circuitry determines the client as having the authority to access the resource; and
    transmit the access token to the terminal,
    wherein the processing circuitry issues the access token, which includes the first identification information identifying the source apparatus having issued the access token.

* * * * *